US011341060B2

(12) United States Patent
Siegel et al.

(10) Patent No.: US 11,341,060 B2
(45) Date of Patent: May 24, 2022

(54) MULTIFUNCTION COMMUNICATION INTERFACE SUPPORTING MEMORY SHARING AMONG DATA PROCESSING SYSTEMS

(71) Applicant: INTERNATIONAL BUSINESS MACHINES CORPORATION, Armonk, NY (US)

(72) Inventors: Michael S. Siegel, Research Triangle Park, NC (US); William J. Starke, Round Rock, TX (US); Jeffrey A. Stuecheli, Austin, TX (US); Lakshminarayana Arimilli, Austin, TX (US); Kenneth M. Valk, Rochester, MN (US); James Mikos, Rochester, MN (US); David Krolak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 16/990,594

(22) Filed: Aug. 11, 2020

(65) Prior Publication Data

US 2022/0050787 A1 Feb. 17, 2022

(51) Int. Cl.
*G06F 12/1009* (2016.01)
*G06F 12/084* (2016.01)
(Continued)

(52) U.S. Cl.
CPC ...... *G06F 12/1009* (2013.01); *G06F 12/0646* (2013.01); *G06F 12/084* (2013.01); *G06F 13/1663* (2013.01); *G06F 13/1668* (2013.01)

(58) Field of Classification Search
None
See application file for complete search history.

(56) References Cited

U.S. PATENT DOCUMENTS 6,240,492 B1   5/2001   Foster et al.
9,658,963 B2   5/2017   Morris et al.
(Continued)

FOREIGN PATENT DOCUMENTS

| CN | 101290805 A | 10/2008 |
| CN | 110032489 A | 7/2019 |
| WO | 2016037344 A1 | 3/2016 |

OTHER PUBLICATIONS

"IBM POWER9 opens up a new era of acceleration enablement: OpenCAPI" J. Stuecheli; W. J. Starke; J. D. Irish; L. B Arimilli; D. Dreps; B. Blaner; C. Wollbrink; B. Allison IBM Journal of Research and Development, Year: 2018 | vol. 62, Issue: 4/5.

(Continued)

*Primary Examiner* — Charles J Choi
(74) *Attorney, Agent, or Firm* — Brian F. Russell; Nathan Rau

(57) ABSTRACT

In a data processing environment, a communication interface of a second host data processing system receives, from a first host data processing system, a host command in a first command set. The host command specifies a memory access to a memory coupled to the second host data processing system. The communication interface translates the host command into a command in a different second command set emulating coupling of an attached functional unit to the communication interface. The communication interface presents the second command to a host bus protocol interface of the second host data processing system. Based on receipt of the second command, the host bus protocol interface initiates, on a system fabric of the second host data processing system, a host bus protocol memory access request specifying the memory access.

22 Claims, 22 Drawing Sheets

(51) Int. Cl.
*G06F 13/16* (2006.01)
*G06F 12/06* (2006.01)

(56) References Cited

U.S. PATENT DOCUMENTS

| | | | |
|---|---|---|---|
| 10,540,185 B1 | 1/2020 | Harris et al. | |
| 10,698,440 B2 | 6/2020 | Carlough et al. | |
| 2004/0128371 A1 | 7/2004 | Park et al. | |
| 2010/0268868 A1* | 10/2010 | Hu | G06F 12/0246 |
| | | | 711/103 |
| 2012/0023293 A1* | 1/2012 | Contino | G06F 3/0661 |
| | | | 711/115 |
| 2020/0097359 A1 | 3/2020 | O'Connor et al. | |
| 2020/0192676 A1 | 6/2020 | Pearce et al. | |
| 2020/0192715 A1 | 6/2020 | Wang et al. | |
| 2020/0226070 A1* | 7/2020 | Byun | G06F 12/0246 |
| 2021/0240616 A1* | 8/2021 | Stabrawa | G06F 12/0804 |

OTHER PUBLICATIONS

"Speculation Cache For On-Chip Proxy (Hold for Publication—See Dossier)" Disclosed Anonymously, IPCOM000253221D, Mar. 14, 2018.
"Design of Database Systems with DRAM-only Heterogeneous Memory Architecture" Yifan Qiao 2020 IEEE 36th International Conference on Data Engineering (ICDE), Apr. 20-24, 2020 DOI: 10.1109/ICDE48307.2020.00243.
International application No. PCT/IB2021/056733, International Filing Date: Jul. 26, 2021, ISR/WO (International Search Report and Written Opinion).

* cited by examiner

MULTIFUNCTION COMMUNICATION INTERFACE SUPPORTING MEMORY SHARING AMONG DATA PROCESSING SYSTEMS

BACKGROUND OF THE INVENTION

The present invention relates generally to data processing and, in particular, to an improved communication interface and communication protocol for communication between data processing system components and data processing systems.

A conventional multiprocessor (MP) data processing system comprises multiple processing units (which can each include one or more processor cores and their various cache memories), input/output (I/O) devices, and data storage, which can include both system memory (volatile and/or nonvolatile) and nonvolatile mass storage. As processor technology continues to mature and as the size of code and working data sets continues to grow, system memory is increasingly becoming a dominant driver of the overall cost of enterprise-class systems. Consequently, data processing system designs that support dynamic sharing of system memory of different data processing systems or sharing of large centralized "memory tanks" between data processing systems are increasingly favored in that the per-system cost of system memory can be reduced.

Some data processing systems support the sharing of system memory through dedicated hardware, which tends to be costly (reducing or negating the benefit of memory sharing) and to not scale well as enterprise sizes grow. The present application appreciates that it would be useful and desirable to augment existing data processing system communication interfaces to support system-to-system and/or system-to-centralized-memory-tank communication at low incremental cost and complexity.

BRIEF SUMMARY

In at least one embodiment, a communication interface of a second host data processing system receives, from a first host data processing system, a host command in a first command set. The host command specifies a memory access to a memory coupled to the second host data processing system. The communication interface translates the host command into a command in a different second command set emulating coupling of an attached functional unit to the communication interface. The communication interface presents the second command to a host bus protocol interface of the second host data processing system. Based on receipt of the second command, the host bus protocol interface initiates, on a system fabric of the second host data processing system, a host bus protocol memory access request specifying the memory access. As a result of this process, a host data processing system can employ an existing communication interface suitable for supporting attachment of an attached functional unit for host-to-host memory sharing.

In at least one embodiment, a page table entry for an address specified in the second command is pinned in a page frame table of the second host data processing system. With the page table entry pinned in the page frame table, asymmetry is permitted between the first and second command sets.

In at least one embodiment, the communication interface is a first communication interface, the second host data processing system includes a second communication interface, and the host command is a first host command. In such an embodiment, the second communication interface, based on receiving the host bus protocol memory access request on the system fabric, issues a second host command specifying the memory access. In this way, the memory access request is transported via the system fabric of the second host data processing system to an attached memory or third host data processing system coupled to the second communication interface.

In at least one embodiment, the communication interface includes a first operating mode supporting attachment of an attached functional unit to the second host data processing system and a second operating mode supporting coupling of the first host data processing system to the second host data processing system for host-to-host memory sharing. In such an embodiment, the communication interface is configured in the second operating mode to support host-to-host memory sharing.

In at least one embodiment, a communication controller for a host data processing system having a system fabric includes controller circuitry. The controller circuitry is configured to receive, from another data processing system, a host command in a first command set, where the host command specifies a memory access to a memory coupled to the host data processing system. The host command is translated by the controller circuitry into a command in a different second command set emulating coupling of an attached functional unit to the communication controller. The controller circuitry presents the second command to a host bus protocol interface, which, based on receipt of the second command, initiates on the system fabric of the host data processing system a host bus protocol memory access request specifying the memory access.

In at least one embodiment, a design structure is tangibly embodied in a machine-readable storage device for designing, manufacturing, or testing an integrated circuit. The design structure comprises a communication controller for a host data processing system having a system fabric. The communication controller includes controller circuitry configured to receive, from another data processing system, a host command in a first command set, where the host command specifies a memory access to a memory coupled to the host data processing system. The host command is translated by the controller circuitry into a command in a different second command set emulating coupling of an attached functional unit to the communication controller. The controller circuitry presents the second command to a host bus protocol interface, which, based on receipt of the second command, initiates on the system fabric of the host data processing system a host bus protocol memory access request specifying the memory access.

DETAILED DESCRIPTION

Figure 1:
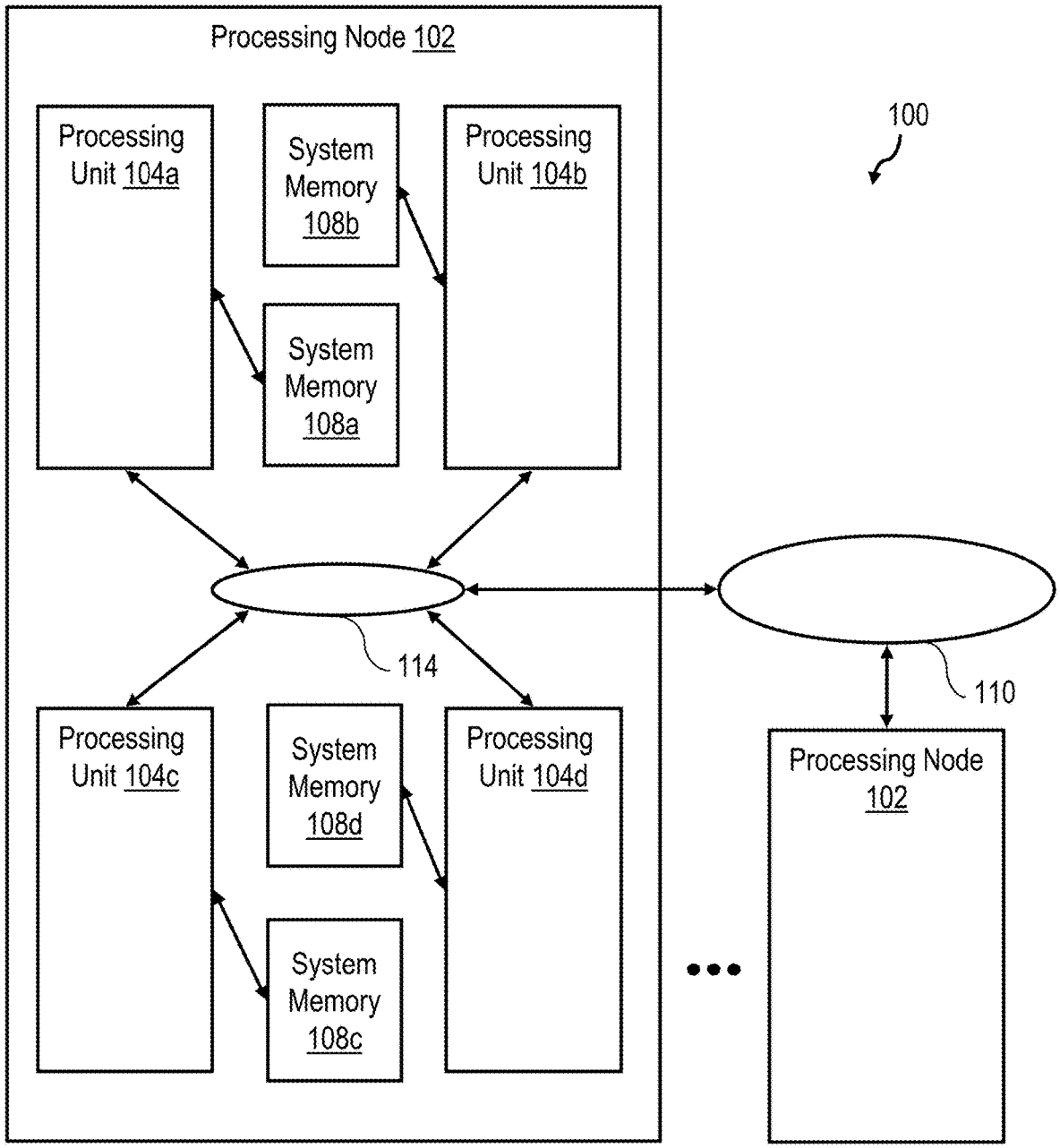
FIG. 1 is a high-level block diagram of an exemplary host data processing system in accordance with one embodiment.

With reference now to the figures, in which like reference numerals refer to like and corresponding parts throughout, and in particular with reference to FIG. 1, there is illustrated a high-level block diagram depicting an exemplary data processing system 100 in accordance with one embodiment. In various use cases and topologies, a data processing system such as data processing system 100, which includes hardware components and may additionally include software and/or firmware components, may be referred to in the art as a "host" or "host data processing system."

In the depicted embodiment, data processing system 100 is a cache-coherent multiprocessor (MP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing one or more (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric. In at least some preferred embodiments, communication on the system fabric is compliant with a so-called host bus protocol, which defines, inter alia, predetermined sets of legal requests, responses, and control information communicated between communication participants (e.g., caches, memory controllers, etc.) via the system fabric.

As described below in greater detail with reference to FIG. 2, in some embodiments, one or more of processing units 104 (and possibly all of processing units 104) each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. In alternative embodiments, one or more memory controllers 106 (and system memories 108) can be directly coupled or indirectly coupled (e.g., via a switch) to system interconnect 110 rather than a local interconnect 114.

Those skilled in the art will appreciate that data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
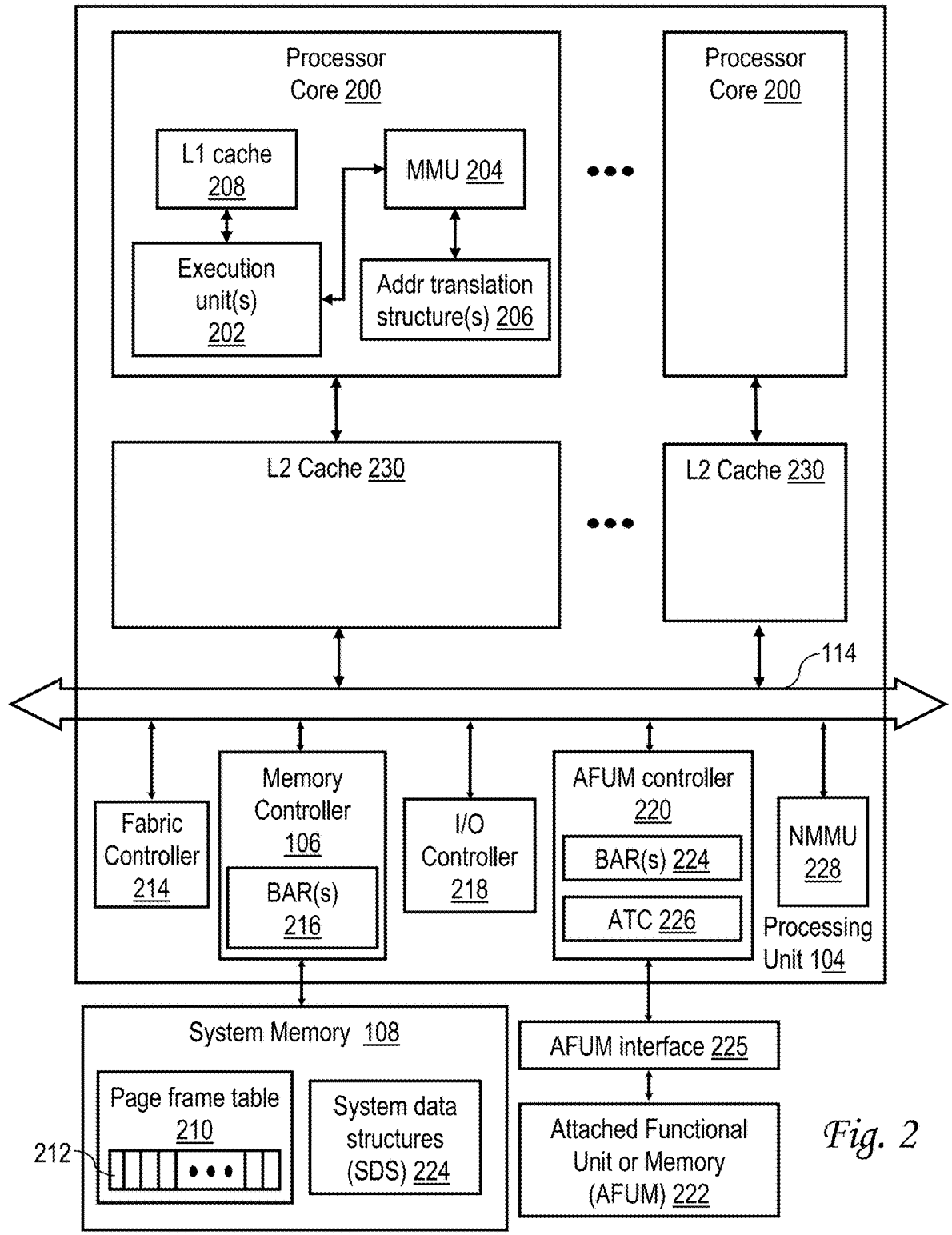
FIG. 2 is a more detailed block diagram of an exemplary processing unit of a host data processing system in accordance with one embodiment.

Referring now to FIG. 2, there is depicted a more detailed block diagram of an exemplary processing unit 104 and a system memory 108 in accordance with one embodiment. In the depicted embodiment, each processing unit 104 is an integrated circuit including one or more processor cores 200 for processing instructions and data. In the depicted example, a processor core 200 includes one or more execution units 202 that execute instructions from multiple simultaneous hardware threads of execution.

Processor core 200 additionally includes a memory management unit (MMU) 204 responsible for translating effective addresses determined by the execution of memory-referent instructions in execution unit(s) 202 into real addresses within a real address space referenced by all processing units 104 within data processing system 100. MMU 204 performs effective-to-real address translation by reference to one or more translation structure(s) 206, such as a translation lookaside buffer (TLB), effective-to-real address translation (ERAT) cache, segment lookaside buffer (SLB), etc. The number and/or type of these address translation structures may vary between implementations and architectures. Address translation structure(s) 206 reduce the latency associated with address translation by buffering local copies of selected address translations, which may be retrieved from system memories 108, as discussed further below.

The operation of each processor core 200 is supported by a multi-level memory hierarchy having at its lowest level the composite system memory provided by the various system memories 108 and made accessible via memory controllers 106. The real address range(s) for which an individual memory controller 106 is responsible can be defined, for example, by hypervisor and/or operating system software, through the appropriate configuration of one or more base address registers (BARs) 216 within the memory controller 106. As illustrated, one or more of system memories 108 store one or more system data structures (SDSs) 224, which provide bookkeeping for host-to-host memory sharing as described herein. For example, SDSs 224 may define the various address ranges assigned to different memories and communication links of data processing system 100, as described below. Additionally, one or more system memories 108 store a page frame table 210 containing a plurality of page table entries (PTEs) 212, where each PTE 212 specifies an effective-to-real address translation for a respective corresponding memory page present in one of system memories 108. PTEs 212 additionally specify access protections (e.g., read-only, read/write (R/W), etc.) for the different memory pages. PTEs 212 accessed from page frame table 210 by a MMU 204 may be cached by the MMU 204 for subsequent access, for example, in address translation structure(s) 206. SDSs 224 and page frame table 210 can be established, maintained, and updated, for example, by operating system and/or hypervisor software executing within data processing system 100.

The multi-level memory hierarchy of each processor core 200 additionally includes one or more levels of cache memory, which in the illustrative embodiment include a store-through level one (L1) cache 208 within and private to each processor core 200 and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

In the depicted embodiment, each processing unit 104 further includes an integrated and distributed fabric controller 214 responsible for controlling the flow of operations on the system fabric in accordance with the host bus protocol and for implementing the coherency communication required to implement the desired cache coherency protocol. Processing unit 104 can further include an integrated I/O (input/output) controller 218 supporting the attachment of one or more I/O devices and/or I/O channels (not illustrated).

In the depicted example, processing unit 104 also includes an attached functional unit or memory (AFUM) controller 220 that, in at least one operating mode, supports the attachment to host data processing system 100 of an attached device, referred to herein as an attached functional unit or memory (AFUM) 222. Thus, AFUM 222 can be a device like a memory that simply responds to host commands received from host data processing system 100, or alternatively, can be a device that can issue AFUM commands (including AFUM read and AFUM write commands) to host data processing system 100. The real addresses range(s) for which an AFUM controller 220 is responsible when servicing an attached memory can be defined, for example, by hypervisor and/or operating system software, through the appropriate configuration of one or more base address registers (BARs) 224 within the AFUM controller 220. In at least some embodiments, AFUM controller 220 may include an address translation cache (ATC) 226 providing low latency storage for address translations between the real address space referenced by communications on the system fabric and the effective address space utilized by an attached AFUM 222 (which is preferably the same as the effective address spaced referenced by processor cores 200).

As indicated, AFUM 222 is coupled to AFUM controller 220 via an AFUM interface 225. In some cases, AFUM interface 225 can be integrated or packaged with AFUM 222. In other cases, AFUM interface 225 can be implemented in a separate device or package from AFUM 222. It should also be appreciated that multiple different types of AFUMs 222 can be concurrently implemented within a host data processing system 100. For example, one or more AFUMs 222 can be attached functional units (AFUs) (e.g., accelerator chips), while one or more other AFUMs 222 can be attached memory devices.

In the embodiment of FIG. 2, processing unit 104 additionally includes a nest memory management unit (NMMU) 228, which, upon request, provides address translations to other communication participants, such as AFUM controller 220. It should be appreciated that in other embodiments, NMMU 228 may be communicatively coupled to provide address translations to communication participants including AFUM controller 220 in an alternative or additional manner, for example, by being coupled to system interconnect 110 rather than to local interconnect 114.

Figure 3:
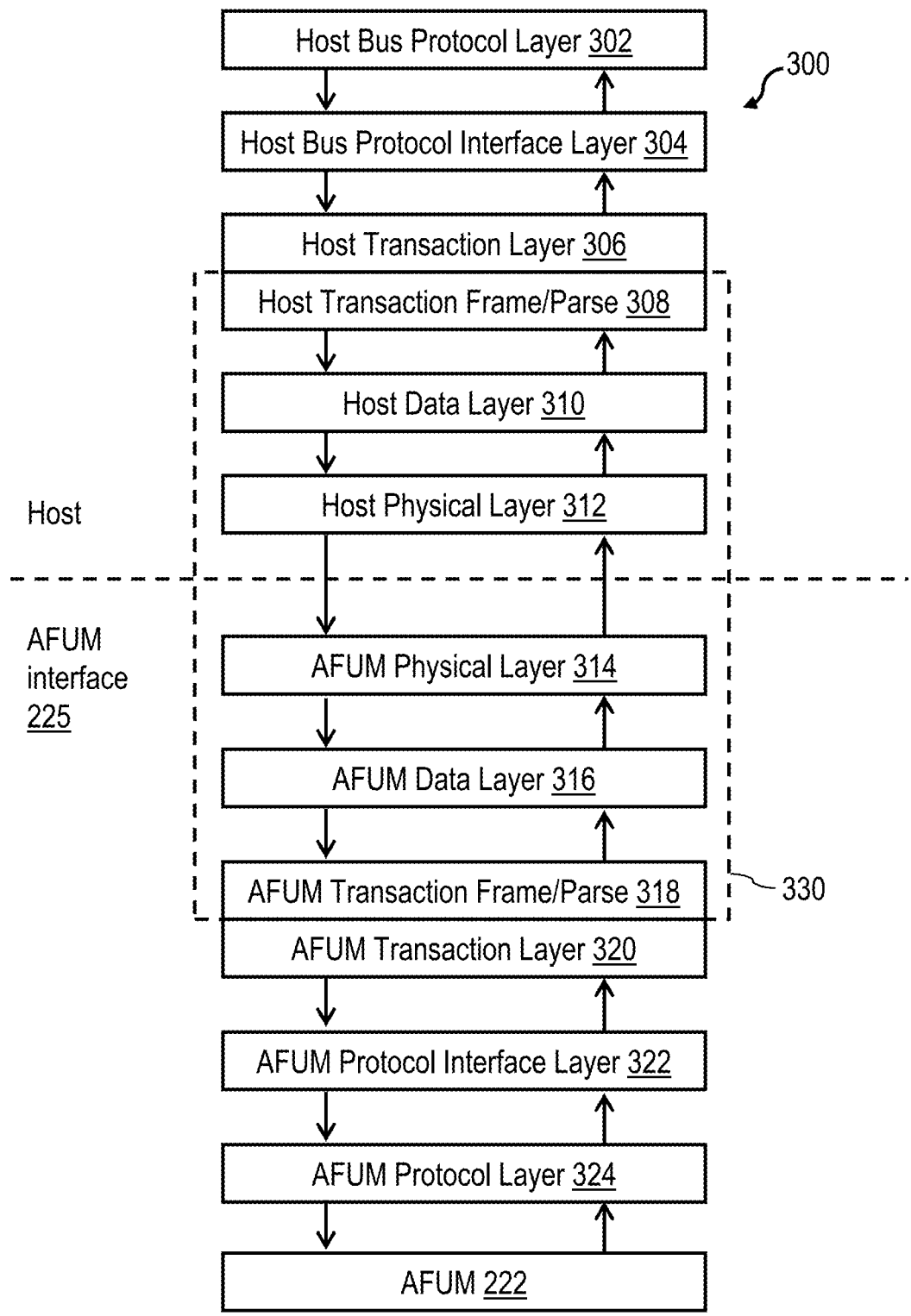
FIG. 3 illustrates an exemplary protocol stack for a communication interface between a host data processing system and an attached functional unit or memory (AFUM) in accordance with one embodiment.

With reference now to FIG. 3, there is illustrated an exemplary protocol stack 300 for communication of information between a host data processing system (e.g., data processing system 100) and an AFUM 222 in accordance with one embodiment. The communication protocol implemented by protocol stack 300 defines the rules, syntax, semantics, and timing of communication between host data processing system 100 and AFUM 222. As is typical, protocol stack 300 includes a number of individual layers, each performing a specific subset of the communication protocol and communicating the results of its processing with the adjoining layer(s). Each of the layers of protocol stack 300 may be implemented by hardware, software, or a combination of both hardware and software.

In the depicted example, on the host side, protocol stack 300 includes a host bus protocol layer 302, host bus protocol interface layer 304, host transaction layer 306, host transaction frame/parse layer 308, host data layer 310, and host physical layer 312, which can all be implemented, for example, in AFUM controller 200. Host bus protocol layer 302 is configured to receive and issue commands (requests), responses, and control information on the system fabric of a host data processing system 100 utilizing the host bus protocol implemented by that host data processing system 100. Host bus protocol interface layer 304 provides an interface that converts information received from host bus protocol layer 302 into individual transactions, which are received and processed by host transaction layer 306. Host bus protocol interface layer 304 similarly converts transactions received from host transaction layer 306 into commands, responses and control information within the host bus protocol implemented by host bus protocol layer 302. Host transaction frame/parse layer 308 packs and unpacks sequences of one or more transactions into and out of frames handled by host data layer 310. Host data layer 310 supervises the delivery of frames to, and receipt of frames from, AFUM interface 225 via host physical layer 312. For example, host data layer 310 can perform functions such as checking frame integrity, providing error correction, and replaying frames that contain errors on host physical layer 312.

The layers of protocol interface 300 implemented within AFUM interface 225, which each correspond to a similar protocol layer on the host side, include a AFUM protocol layer 324, AFUM protocol interface layer 322, AFUM transaction layer 320, AFUM transaction frame/parse layer 318, AFUM data layer 316, and AFUM physical layer 314. AFUM protocol layer 324 is configured to communicate commands (requests), responses, and control information with AFUM 222 utilizing a protocol implemented by AFUM 222. AFUM protocol interface layer 322 provides an interface that converts between the information communicated by AFUM protocol layer 324 and individual transactions processed by AFUM transaction layer 320. AFUM transaction frame/parse layer 318 packs and unpacks sequences of one or more transactions into and out of frames handled by AFUM data layer 316. AFUM data layer 316 supervises the delivery of frames to the host, and receipt of frames from the host, via AFUM physical layer 314, for example, by checking frame integrity, providing error correction, and replaying frames that contain errors.

In at least some embodiments, the layers of protocol stack 300 collectively indicated at reference numeral 330 can be implemented in a conventional manner. To avoid unnecessarily obscuring the innovative concepts disclosed herein, the following discussion and illustrations omit protocol layers 330, and their presence will simply be assumed.

Figure 4:
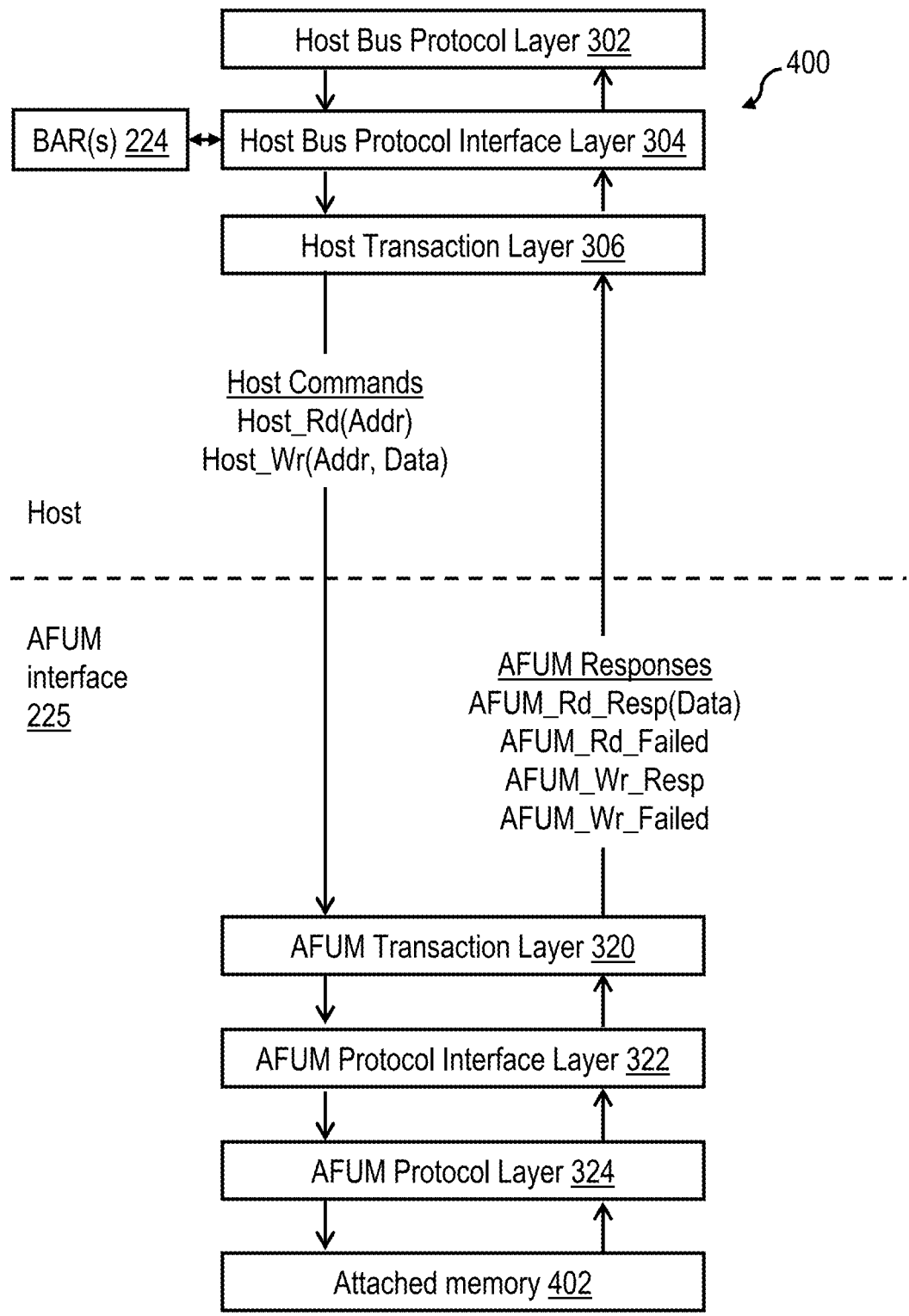
FIG. 4 depicts an exemplary protocol stack for a communication interface configured to support attachment of a memory device to a host data processing system in accordance with one embodiment.

Referring now to FIG. 4, there is depicted an exemplary protocol stack 400 for a communication interface configured to support attachment of an attached memory device 402 to a host data processing system 100 in accordance with one embodiment. As indicated by like reference numerals, protocol stack 400 includes a host bus protocol layer 302, host bus protocol interface layer 304, and a host transaction layer 306, which as previously described can be implemented within AFUM controller 220 of a host data processing system 100. AFUM interface 225 similarly includes an AFUM protocol layer 324, AFUM protocol interface layer 322, and AFUM transaction layer 320 as previously described. AFUM protocol layer 324 of AFUM interface 225 is communicatively coupled to an AFUM implemented as an attached memory 402.

With this arrangement, host bus protocol interface layer 304 receives host bus protocol requests, such as host bus protocol read and write requests, on the system fabric of the host data processing system 100. Each host bus protocol read or write request specifies at least the request type and a real address to be accessed, and host bust protocol write requests additionally specify data to be written to the specified real address. For each such host bus protocol request, host bus protocol interface layer 304 determines by reference to BAR(s) 224 whether or not the real address of the request falls within a real address range associated with attached memory 402. If not, the host bus protocol request is simply ignored. If, however, the real address of the host bus protocol request falls within a real address range associated with attached memory 402, host bus protocol interface layer 304 forwards the host bus protocol request to host transaction layer 306. Host transaction layer 306, in turn, converts the host bus protocol request to a suitable corresponding host command, which for a host command targeting attached memory 402, is either a host read command specifying a real address (e.g., Host_Rd(Addr)) or a host write command specifying a real address and data to be written into attached memory 402 (e.g., Host_Wr(Addr, Data)).

In response to a host read command, AFUM interface 225 processes the host command through protocol layers 320-

324 and responds with one of two responses—an AFUM read response indicating success and providing the requested data (e.g., AFUM_Rd_Resp(Data)) or an AFUM read response indicating failure of the read request (e.g., AFUM_Rd_Failed). AFUM interface 225 similarly responds to a host write command by processing the host write command and providing one of two responses—an AFUM write response indicating success of the host write command in updating attached memory 402 (e.g., AFUM_Wr_Resp) or an AFUM write response indicating failure of the write command to update attached memory 402 (e.g., AFUM_Wr_Failed). AFUM controller 220 processes the AFUM response received from AFUM interface 225 in host transaction layer 306 and host bus protocol interface layer 304 and, if required or permitted by the host bus protocol, issues a host bus protocol response generated based on the AFUM response on the system fabric of the host data processing system 100. It should be appreciated, however, that some host bus protocols may not require or support a host bus protocol response for an AFUM write response.

Figure 5:
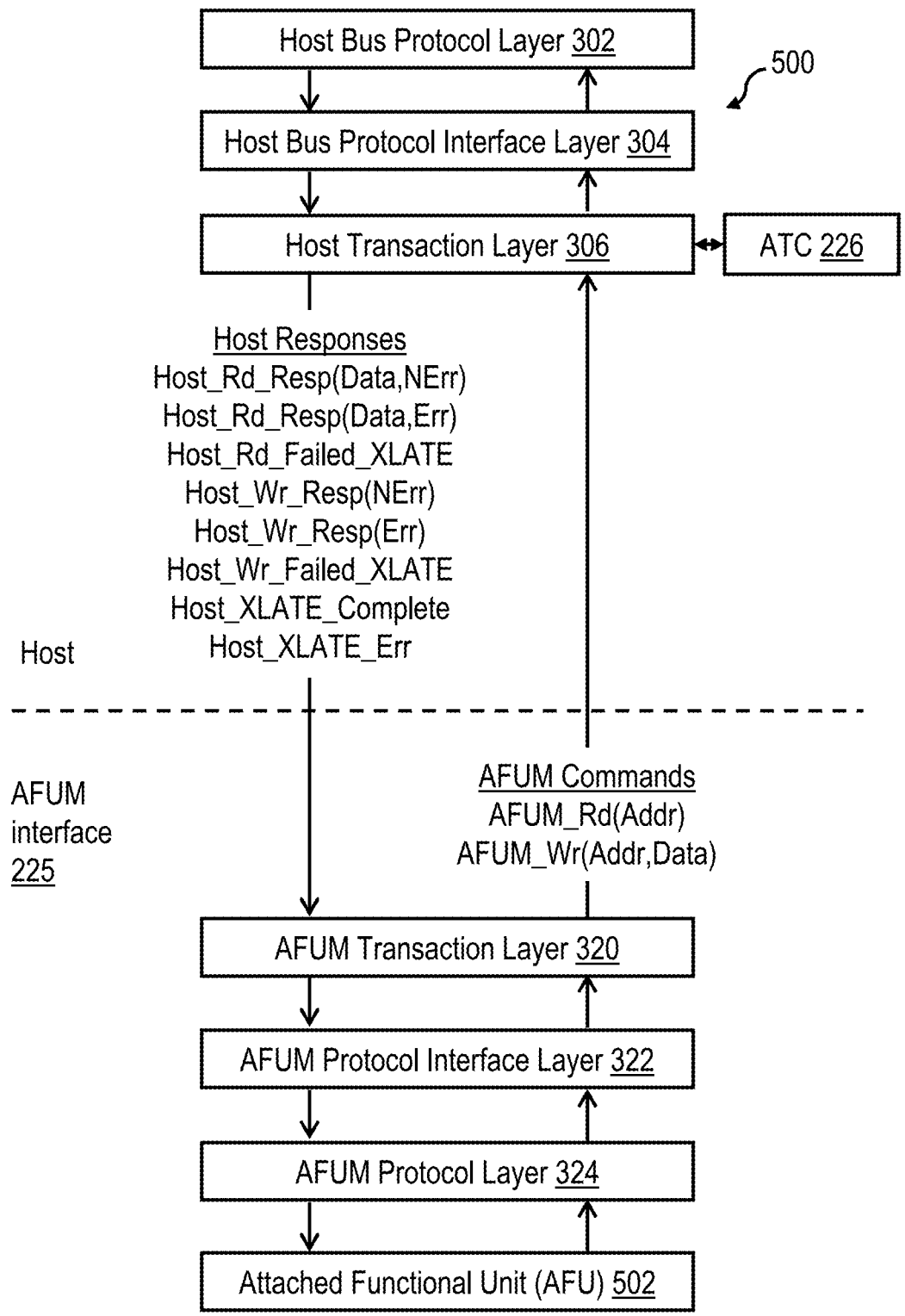
FIG. 5 illustrates an exemplary protocol stack for a communication interface configured to support attachment of an attached functional unit (AFU) to a host data processing system in accordance with one embodiment.

With reference now to FIG. 5, there is illustrated an exemplary protocol stack 500 for a communication interface configured to support attachment of an attached functional unit (AFU) 502 to a host data processing system 100 in accordance with one embodiment. As indicated by like reference numerals, protocol stack 500 includes a host bus protocol layer 302, host bus protocol interface layer 304, and a host transaction layer 306, which as previously described can be implemented within AFUM controller 220 of a host data processing system 100. AFUM interface 225 similarly includes an AFUM protocol layer 324, AFUM protocol interface layer 322, and AFUM transaction layer 320 as previously described. AFUM protocol layer 324 of AFUM interface 225 is communicatively coupled to an AFUM, such as an accelerator, implemented as an AFU 502.

AFU 502 may initiate and issue AFUM commands directed to host data processing system 100. These AFUM commands, which are received by AFUM protocol layer 304, each specify at least the command type and an effective address to be accessed, and may additionally specify data to be written to the specified effective address. Each such AFUM command is processed (and possibly translated) through AFUM protocol interface layer 322 and AFUM transaction layer 320 to issue one of a set of AFUM commands, which include at least an AFUM read command (e.g., AFUM_Rd(Addr)) and an AFUM write command (e.g., AFUM_Wr(Addr,Data)).

In response to an AFUM command, host transaction layer 306 of AFUM controller 220 determines whether ATC 226 holds an address translation entry that can translate the effective address specified by the AFUM command into a real address within the real address space of the host data processing system 100. Based on the success of this effective-to-real address translation and, if successful, the response of the host data processing system 100 to a host bus protocol request generated by protocol layers 302-306 from the AFUM command, protocol layers 302-306 provide an appropriate host response communicated back through protocol layers 320-324 of AFUM interface 225 to AFU 502.

For AFUM read commands, the host data processing system 100 can provide any of three host responses: (1) a host read response indicating successful completion of the read without error and providing the requested data (e.g., Host_Rd_Resp(Data,NErr)), (2) a host read response indicating completion of the read and providing data containing error(s) (e.g., Host_Rd_Resp(Data,Err)), or (3) a host read response indicating initial failure to locate an effective-to-real address translation for the effective address specified by the read write command (e.g., Host_Rd_Failed_XLATE). Host data processing system 100 similarly responds to an AFUM write command by providing one of three host responses: (1) a host write response indicating successful completion of the write without errors (e.g., Host_Wr_Resp (NErr)), (2) a host write response indicating completion of the write with error(s) (e.g., Host_Wr_Resp(Err)), or (3) a host write response indicating initial failure to locate an effective-to-real address translation for the effective address specified by the AFUM write command (e.g., Host_Wr_Failed_XLATE). In addition to these six host responses, host data processing system 100 is additionally configured to provide two additional responses respectively indicating final success or final failure in locating a translation of an effective address specified in an AFUM command (e.g., Host_XLATE_Complete and Host_XLATE_Err).

It should be appreciated that protocol stacks 300, 400, 500 can support additional commands and responses other than the read and write commands and responses specifically detailed in FIG. 4-5. For example, protocol stacks 300-500 can support communication that facilitates other memory access commands (e.g., atomic memory operations (AMOs)), requests interrupts, and supports flow control through the implementation of maintenance of credits and/or virtual channels.

Referring now to FIGS. 6-10, there are depicted time-space diagrams of an AFU read command of an AFU 502 and various possible host responses to the AFU read command in accordance with one embodiment.

Figure 6:
FIG. 6 is a time-space diagram of a read command of an AFU in accordance with one embodiment.

As shown in FIG. 6, AFU 502 issues an AFUM read command 600 (e.g., AFUM_Rd(Addr)) to a host data processing system 100 via protocol stack 500 as discussed above with reference to FIG. 5. In the successful case depicted in FIG. 7, AFUM controller 220 of host data processing system 100 successfully obtains an address translation for the effective address specified in AFUM read command 600, translates the effective address to a real address by reference to the address translation entry, and initiates a host bus protocol read request on the system fabric of host data processing system 100 specifying the real address obtained from the address translation. In response to the host bus protocol read request, the data requested by the host bus protocol read request may be returned to AFUM controller 220, for example, by a cache memory (e.g., one of L2 caches 230) or a memory controller 106. In response to receipt of the requested data, the AFUM controller 220 provides to AFU 502 a host read response 700 providing the requested data and indicating no error (e.g., Host_Rd_Resp (Data,NErr)).

Figure 8:
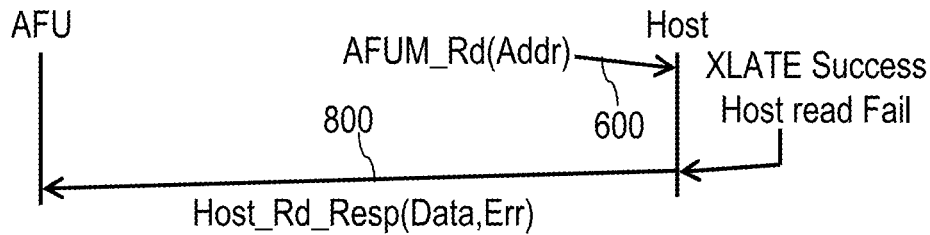

FIG. 8 depicts the case in which a read error occurs. In this case, AFUM controller 220 of host data processing system 100 successfully obtains an address translation for the effective address specified in AFUM read command 600, translates the effective address to a real address by reference to the address translation entry, and initiates a host bus protocol read request on the system fabric of host data processing system 100 specifying the real address obtained from the address translation. However, in this case, the host bus protocol read request fails in the host data processing system 100, for example, because of a parity or ECC (error correcting code) error. In response to an indication of the read error, AFUM controller 220 issues a host read response 800 indicating an error (e.g., Host_Rd_Resp(Data,Err)). In some implementations, the error indication can be provided in the data field of the host read response.

Figure 7:
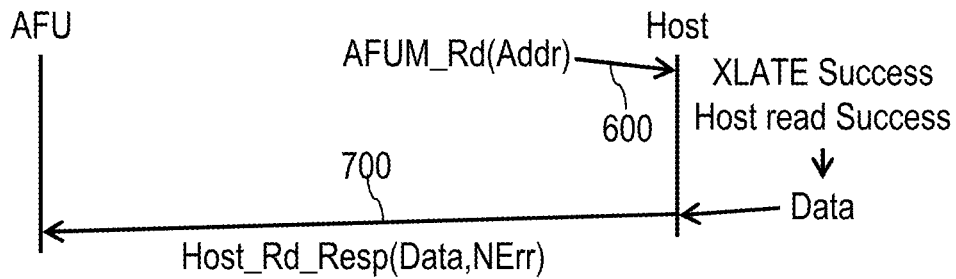
FIGS. 7-10 are time-space diagrams of various responses by a host data processing system to the read command of an AFU in accordance with one embodiment.
Figure 9:
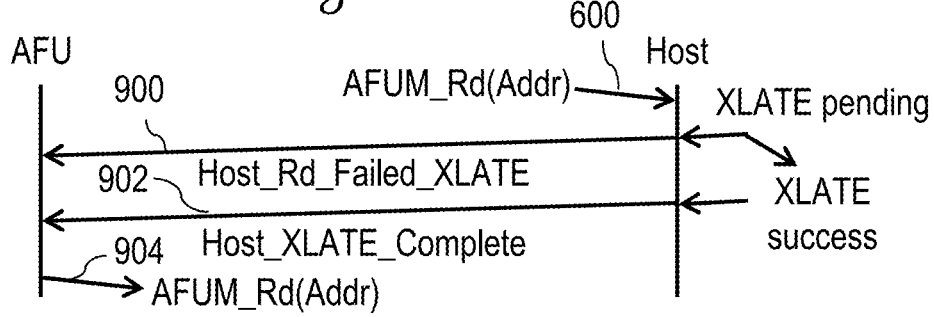

FIG. 9 illustrates the case in which AFUM read command 600 fails due to AFUM controller 220 failing to obtain an address translation entry for the effective address specified by AFUM read command 600, but the needed address translation entry is subsequently provided by operating system software. In this case, AFUM controller 220 of host data processing system 100 receives AFUM read command 600 and attempts to, but fails to obtain an address translation entry for the effective address specified in AFUM read command 600. In response to failure to obtain an address translation entry for the effective address, AFUM controller 220 issues a host read failure response 900 to AFU 502 that indicates that the failure was due to failing to obtain an address translation entry for the effective address (e.g., Host_Rd_Failed_XLATE). In addition, AFUM controller 220 initiates an interrupt of the operating system that requests the needed address translation. In response to the operating system indicating that the address translation is available in page frame table 210, AFUM controller 220 issues to AFUM 222 a host translation complete response 902 (e.g., Host_XLATE_Complete), indicating that the address translation entry for the effective address of AFUM read request 600 is now available. In response to receiving host translation complete response 902, AFU 222 may optionally reissue the AFUM read command as AFUM read command 904 (e.g., AFUM_Rd(Addr)), which may then succeed as shown in FIG. 7 (assuming the address translation entry is still valid in page frame table 210 when AFUM read command 904 is issued).

Figure 10:
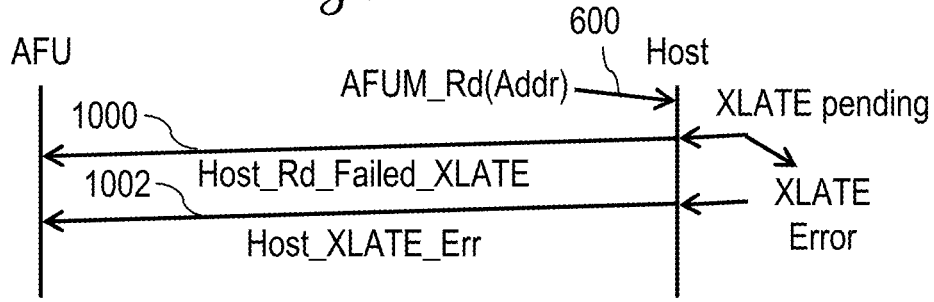

FIG. 10 depicts the case in which AFUM read command 600 fails due to AFUM controller 220 failing to obtain an address translation entry for the effective address specified by AFUM read command 600 and the needed address translation is not subsequently provided by the operating system. In this case, AFUM controller 220 of host data processing system 100 receives AFUM read command 600 and attempts to, but fails to obtain an address translation entry for the effective address specified in AFUM read command 600. In response to failure to obtain an address translation entry for the effective address, AFUM controller 220 issues a host read failure response 1000 to AFU 502 that indicates that the failure was due to failing to obtain an address translation entry for the effective address (e.g., Host_Rd_Failed_XLATE). In addition, AFUM controller 220 initiates an interrupt of the operating system that requests the needed address translation. In response to the operating system indicating that the address translation is not available, AFUM controller 220 issues to AFUM 222 a host translation error response 1002 (e.g., Host_XLATE_Err), indicating that no address translation entry for the effective address of AFUM read request 600 was found.

With reference now to FIGS. 11-15, there are illustrated time-space diagrams of a write command of an AFU 502 and various responses by a host data processing system to the write command AFU 502 in accordance with one embodiment.

Figure 11:
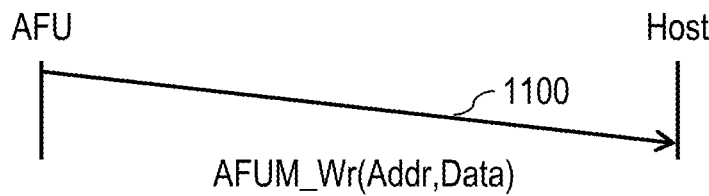
FIG. 11 is a time-space diagram of a write command of an AFU in accordance with one embodiment.

As shown in FIG. 11, AFU 502 issues an AFUM write command 1100 (e.g., AFUM_Wr(Addr,Data)) to a host data processing system 100 via protocol stack 500 as discussed above with reference to FIG. 5. In the successful case depicted in FIG. 12, AFUM controller 220 of host data processing system 100 successfully obtains an address translation and write permission for the effective address specified in AFUM write command 1100. Once the needed address translation and write permission are obtained, AFUM controller 220 translates the effective address to a real address by reference to the address translation entry and initiates a host bus protocol write request on the system fabric of host data processing system 100. The host bus protocol write request specifies the real address obtained from the address translation and includes or is accompanied with the data payload of AFUM write command 1100. In response to success of the host bus protocol write request in updating system memory 108 (or another memory-mapped resource, such as an attached memory 402), AFUM controller 220 provides to AFU 502 a host write response 1200 indicating no error (e.g., Host_Wr_Resp(NErr)).

Figure 13:
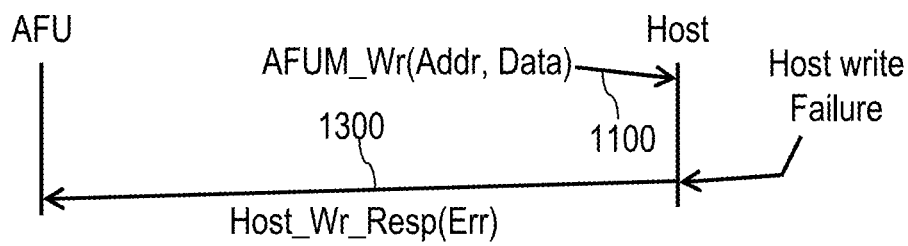

FIG. 13 depicts the case in which a write failure occurs. In this case, AFUM controller 220 of host data processing system 100 responds to AFUM write command 1100 by obtaining an address translation entry and write permission for the effective address specified in AFUM write command 1100. Once the needed address translation and write permission are obtained, AFUM controller 220 translates the effective address to a real address by reference to the address translation entry and initiates a host bus protocol write request on the system fabric of host data processing system 100. Again, the host bus protocol write request specifies the real address obtained from the address translation and includes or is accompanied with the data payload of AFUM write command 1100. However, in this case, the host bus protocol write request fails in the host data processing system 100, for example, because of a parity or ECC error. In response to a message on the system fabric indicating failure of the host bus protocol write request, AFUM controller 220 issues a host write response 1300 indicating a write error (e.g., Host_Wr_Resp(Err)).

Figure 12:
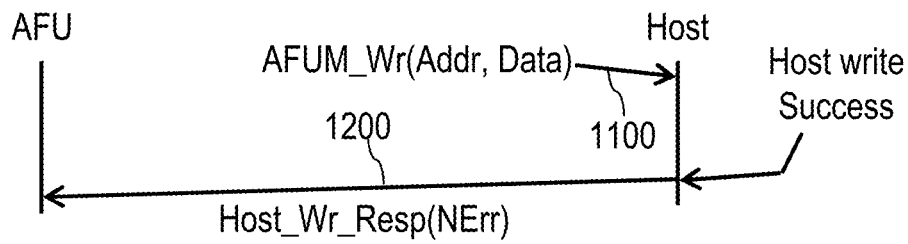
FIGS. 12-15 are time-space diagrams of various responses by a host data processing system to the write command of an AFU in accordance with one embodiment.
Figure 14:
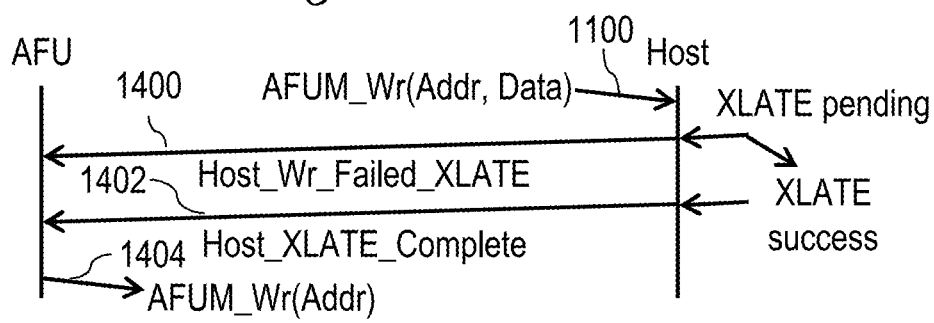

FIG. 14 illustrates the case in which AFUM read command 1100 fails due to AFUM controller 220 failing to obtain an address translation entry and write permission for the effective address specified by AFUM write command 1100, but the needed address translation entry and write permission are subsequently provided by the operating system. In this case, AFUM controller 220 of host data processing system 100 receives AFUM write command 1100 and attempts to, but fails to obtain an address translation entry and write permission for the effective address specified in AFUM write command 1100. In response to failure to obtain an address translation entry and write permission for the effective address, AFUM controller 220 issues a host write failure response 1400 to AFU 502 that indicates that the failure was due to failing to obtain the address translation entry and write permission for the effective address (e.g., Host_Wr_Failed_XLATE). In addition, AFUM controller 220 initiates an interrupt of the operating system that requests the needed address translation and write permission. In response to the operating system indicating that the address translation and write permission are available in page frame table 210, AFUM controller 220 issues to AFUM 222 a host translation complete response 1402 (e.g., Host_XLATE_Complete), indicating that the address translation entry for the effective address of AFUM write command 1100 is now available. In response to receiving host translation complete response 1402, AFU 222 may optionally reissue the AFUM write command as AFUM write command 1404 (e.g., AFUM_Wr(Addr)), which may then succeed as shown in FIG. 12 (assuming the address translation entry and write permission is still valid in page frame table 210 when AFUM write command 1404 is issued).

Figure 15:
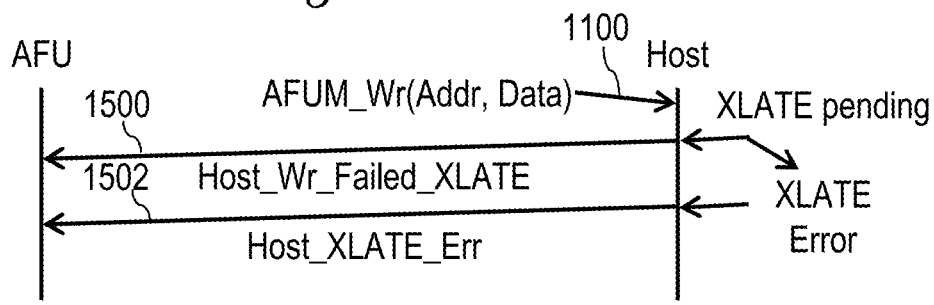

FIG. 15 depicts the case in which AFUM write command 1100 fails due to AFUM controller 220 failing to obtain an address translation entry for the effective address specified by AFUM write command 1100 and the address translation entry and write permission are not subsequently provided by the operating system. In this case, AFUM controller 220 of host data processing system 100 receives AFUM write command 1100 and attempts to, but fails to obtain an address translation entry and write permission for the effective address specified in AFUM write command 1100. In response to failure to obtain an address translation entry and write permission for the effective address, AFUM controller 220 issues a host write failure response 1400 to AFU 502 that indicates that the failure was due to failing to obtain the address translation entry and write permission for the effective address (e.g., Host_Wr_Failed_XLATE). In addition, AFUM controller 220 initiates an interrupt of the operating system that requests the needed address translation and write permission. In response to the operating system indicating the requested address translation entry and/or write permission are not available, AFUM controller 220 issues to AFUM 222 a host translation error response 1502 (e.g., Host_XLATE_Err), indicating that the address translation entry and/or write permission for the effective address of AFUM write command 1100 were not found.

Figure 16:
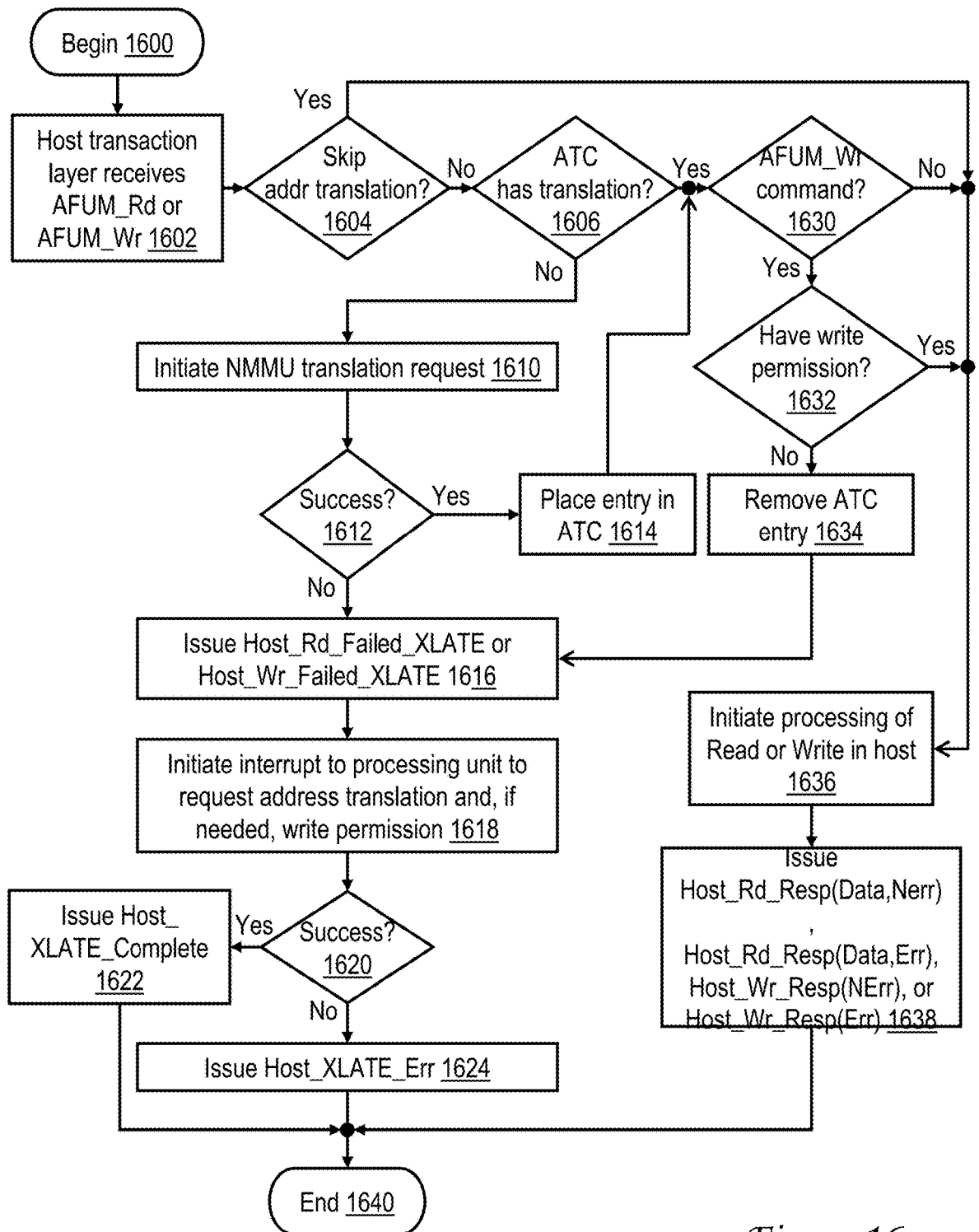
FIG. 16 is a high-level logical flowchart of an exemplary method by which a host transaction layer of a host data processing system responds to a command of an AFU in accordance with one embodiment.

Referring now to FIG. 16, there is depicted a high-level logical flowchart of an exemplary method by which a host transaction layer 306 of a host data processing system 100 responds to a command of an AFU 502 in accordance with one embodiment. The process of FIG. 16 begins at block 1600 and then proceeds to block 1602, which illustrates host transaction layer 306 receiving from AFU 502 either an AFUM read command 600 (see, e.g., FIG. 6) or an AFUM write command 1100 (see, e.g., FIG. 11). In response to receipt of the AFUM command, host transaction layer 306 determines at block 1604 whether or not to skip translation of the effective address specified in the AFUM command. Host transaction layer 306 can determine to skip translation of the effective address, for example, based on the effective address of the AFUM command 600 or 1100 falling within a predetermined address range, an indication provided in the AFUM command 600 or 1100, and/or a configuration of AFUM controller 220. In response to a determination at block 1604 to skip translation of the effective address specified the AFUM command, the process proceeds to block 1636, which is described below. Otherwise, the process passes to block 1606.

Block 1606 illustrates host transaction layer 306 determining whether or not ATC 226 holds an address translation entry for translating the effective address specified in the AFUM command 600 or 1100 into a real address. In response to host transaction layer 306 determining that ATC 226 holds the relevant address translation entry, the process proceeds to block 1630 and following blocks. If, on the other hand, host transaction layer 306 determines that ATC 226 does not hold the relevant address translation entry, the process passes from block 1606 to block 1610 and following blocks.

Referring now to block 1610, host transaction layer 306 initiates transmission to NMMU 228, via host bus protocol interface layer 304 and host bus protocol layer 302, of a NMMU translation request for the effective address of the AFUM command (block 1610). Host transaction layer 306 then awaits receipt of a host bus protocol response to the NMMU translation request (block 1612). In response to receipt of a host bus protocol response to the NMMU translation request indicating success and supplying the requested address translation entry, host transaction layer 306 installs the address translation entry into ATC 226 (block 1614). The process then proceeds to block 1630, which is described below.

In response to the host bus protocol response to the NMMU translation request not indicating success (i.e., the address translation entry is not returned by NMMU 228), the process proceeds from block 1612 to block 1616, which illustrates host transaction layer 306 issuing a host read failure response 900, 1000 (e.g., Host_Rd_Failed_XLATE) or host write failure response 1400, 1500 (e.g., Host_Wr_Failed_XLATE) to AFU 502. In addition, host transaction layer 306 initiates transmission to a processing unit 102, via host bus protocol interface layer 304 and host bus protocol layer 302, of an interrupt request to an operating system or hypervisor executing on a processor core 200. The interrupt request requests the address translation for the effective address specified by the AFUM command and any needed access permissions (block 1618).

Block 1620 depicts host transaction layer 306 monitoring to determine whether or not a successful response to the interrupt request has been received from the operating system or hypervisor (often provided by a memory-mapped input/output (MMIO) operation). In response to receipt of an indication of success, host transaction layer 306 issues a host translation complete response 902, 1402 (e.g., Host_XLATE_Complete) to AFU 502 (block 1622). However, in response to receipt of an indication of failure, host transaction layer 306 issues a host translation error response 1002, 1502 (e.g., Host_XLATE_Err) to AFU 502 (block 1624). Following either block 1622 or block 1624, the process of FIG. 16 ends at block 1640.

Referring now to block 1630, host transaction layer 306 determines whether or not the AFUM command received at block 1602 is an AFUM write command. If not, the process passes to block 1636, which is described below. If, however, host transaction layer 306 determines that the AFUM command received at block 1602 is an AFUM write command, host transaction layer 306 determines at block 1632 whether or not the address translation entry accessed from ATC 226 at block 1606 or obtained from NMMU 228 at blocks 1612-1614 includes write permission for the real address referenced by the AFUM write command. If so, the process passes to block 1636, which is described below. If, however, host transaction layer 306 determines at block 1632 that the address translation entry does not provide write permission for the real address referenced by the AFUM write command, host transaction layer 306 removes the address translation entry from ATC 226 (block 1634). The process then proceeds to block 1616, which has been described.

With reference to block 1636, host transaction layer 306 initiates processing of the read or write operation specified by the AFUM command within host data processing system 100 by causing issuance of the appropriate host bus protocol request on the system fabric via host bus protocol interface layer 304 and host bus protocol layer 302. It should be appreciated that if a determination is made at block 1604 to skip address translation of the effective address of an AFUM command, other unillustrated techniques, including appropriate configuration of page frame table 210, are utilized to guarantee that the effective address is within a permitted address range and has any required write permission. Depending upon the success or failure of the host bus protocol request initiated at block 1636, host transaction layer 306 issues an appropriate host response to AFU 502 (block 1638). In particular, in response to an AFUM read request, host transaction layer 306 issues either a host read response 700 providing the requested data and indicating no error (e.g., Host_Rd_Resp(Data,NErr)) or a host read response 800 indicating a read error (e.g., Host_Rd_Resp(Data,Err)). In response to an AFUM write command, host transaction layer 306 issues either a host write response 1200 indicating no error (e.g., Host_Wr_Resp(NErr)) 1200 or a host write response 1300 indicating a write error (e.g., Host_Wr_Resp(Err)). Following block 1638, the process ends at block 1640.

Figure 17:
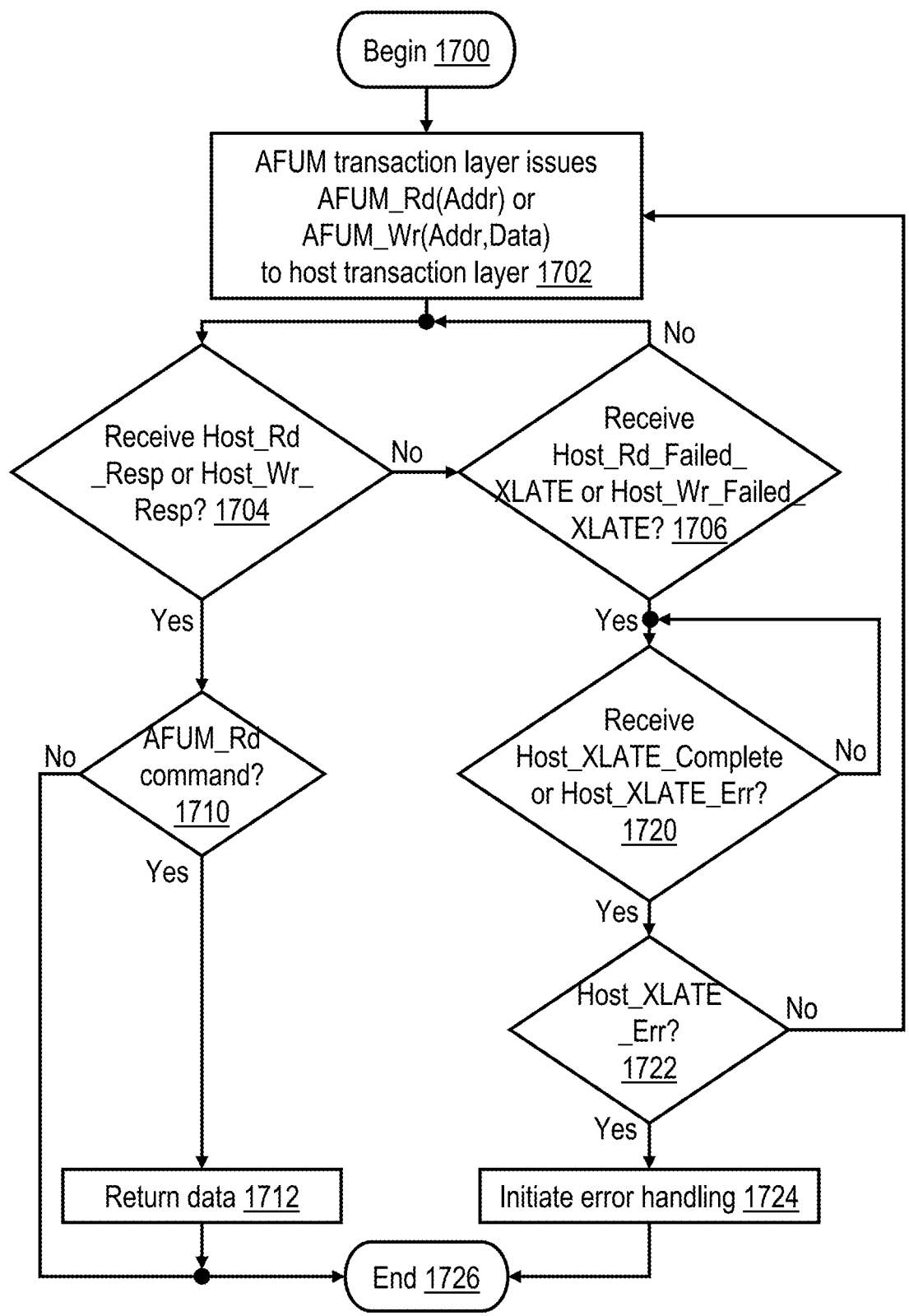
FIG. 17 is a high-level logical flowchart of an exemplary method by which an AFU issues an AFUM command to a host data processing system and handles a host response in accordance with one embodiment.

With reference now to FIG. 17, there is illustrated a high-level logical flowchart of an exemplary method by which an AFU 502 issues a command to a host data processing system 100 and handles the host response in accordance with one embodiment. The process of FIG. 17 begins at block 1700 and then proceeds to block 1702, which illustrates AFUM transaction layer 320 issuing an AFUM command, such as an AFUM read command 600 (e.g., AFUM_Rd(Addr)) or an AFUM write command 1100 (e.g., AFUM_Wr(Addr,Data)), to host transaction layer 306. AFUM transaction layer 320 then monitors for a response to the AFUM command, as shown at blocks 1704-1706. In response to determining at block 1704 that the host response is a host read response 700 providing the data requested by a AFUM read command 600 and indicating no error (e.g., Host_Rd_Resp(Data,NErr)) or a host write response 1200 indicating no error (e.g., Host_Wr_Resp(NErr)), the process passes to block 1710. At indicated at block 1710, if the AFUM command issued at block 1702 was an AFUM write command 1100 rather than an AFUM read command 600, processing by AFUM transaction layer 320 simply ends at block 1726. However, if the AFUM command issued at block 1702 was an AFUM read command 600 rather than an AFUM write command 1100, AFUM transaction layer 320 returns the requested data to AFU 502 (block 1712). Thereafter, the process of FIG. 17 ends at block 1726.

Referring again to block 1704, if the host response received is not a host read response 700 or a host write response 1200, AFUM transaction layer 320 determines at block 1706 whether or not the host response indicates an initial translation failure (e.g., Host_Rd_Failed_XLATE 900, 1000 or Host_Wr_Failed_XLATE 1400, 1500). If not, the process returns to block 1704. If, however, AFUM transaction layer 320 determines that the host response indicates an initial translation failure, AFUM transaction layer 320 iterates at block 1720 monitoring for an additional host translation response indicating whether or not the address translation for the effective address of the AFUM command was successfully loaded into page frame table 210. In response to receipt of a Host_XLATE_Complete response 902, 1402 indicating the address translation for the effective address of the AFUM command was successfully loaded into page frame table 210, the process of FIG. 17 passes from block 1720 to block 1722 and then returns from block 1722 to block 1702. The process following this path represents that AFU 502 can reissue the AFUM command, as shown at reference numerals 904, 1404. If, however, AFUM transaction layer 320 instead receives a Host_XLATE_Err response 1002, 1502, indicating that the translation for the effective address of the AFUM command was not loaded into page frame table 210, the process proceeds from block 1722 to block 1724, which illustrates AFUM transaction layer 320 initiating error handling for the failed AFUM command. Following block 1724, the process of FIG. 17 ends at block 1726.

Figure 18:
FIG. 18 is a time-space diagram of a read command issued by a host data processing system to an attached memory in accordance with one embodiment.
Figure 19:
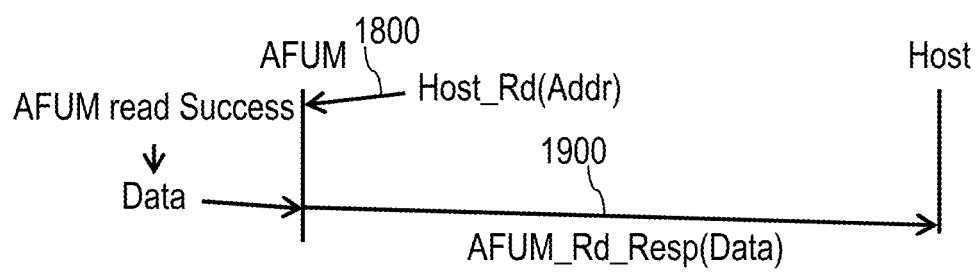
FIGS. 19-20 are time-space diagrams of various responses by an attached memory to the read command of a host data processing system in accordance with one embodiment.
Figure 20:
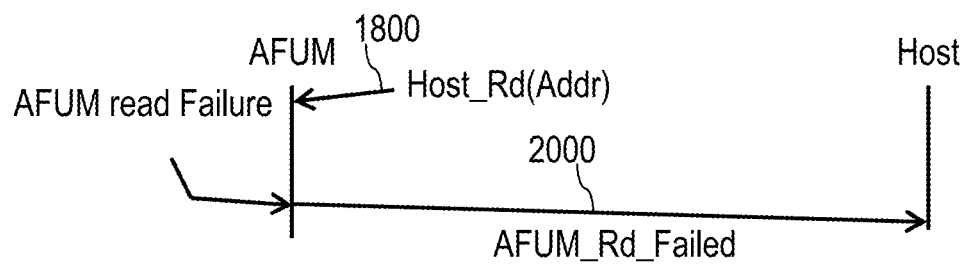

Referring now to FIGS. 18-20, there are depicted time-space diagrams of a host read command issued by a host data processing system 100 to an attached memory 402 and various responses by the attached memory 402 to the host read command of the host data processing system 100 in accordance with one embodiment.

As shown in FIG. 18, AFUM controller 220 of host data processing system 100 issues a host read command 1800 (e.g., Host_Rd(Addr)) to an AFUM 222 configured or implemented as an attached memory 402 via protocol stack 400 as discussed above with reference to FIG. 4. In the successful case depicted in FIG. 19, AFUM transaction layer 320 communicates a read command corresponding to host read command 1800 to attached memory 402 via AFUM protocol interface layer 322 and AFUM protocol layer 324, where protocol layers 320-324 may all be implemented in AFUM interface 225. In response to the read command, attached memory 402 returns the data specified by the real address of host read command 1800. AFUM protocol interface layer 322 forwards the requested data to host transaction layer 306 in an AFUM read response 1900 (e.g., AFUM_Rd_Resp(Data)).

FIG. 20 depicts the case in which a read failure occurs. In this case, attached memory 402 responds to the read command received from AFUM interface 225 with a message indicating failure of the read command. AFUM interface 225 accordingly issues an AFUM read response 2000 indicating a read failure (e.g., AFUM_Rd_Failed). In an alternative implementation, the indication of the read failure can be provided in a data field of an AFUM read response 1900.

Figure 21:
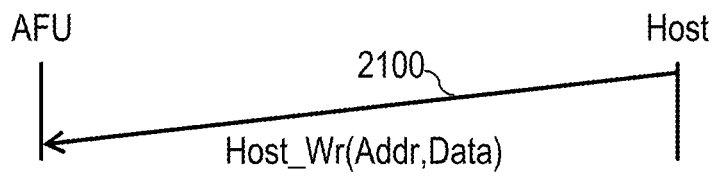
FIG. 21 is a time-space diagram of a write command issued by a host data processing system to an attached memory in accordance with one embodiment.
Figure 22:
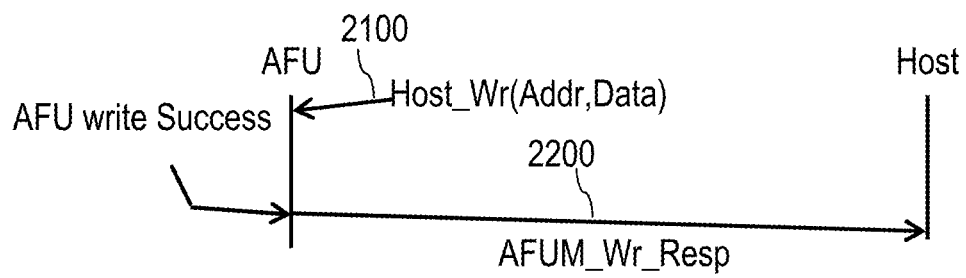
FIGS. 22-23 are time-space diagrams of various responses by an attached memory to the write command of a host data processing system in accordance with one embodiment.
Figure 23:
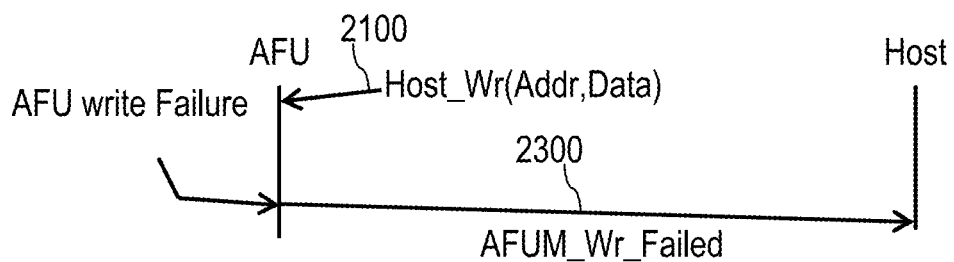

With reference now to FIGS. 21-23, there are illustrated time-space diagrams of a write command issued by a host data processing system 100 to an AFUM 222 configured as an attached memory 402 and various responses by the attached memory 402 to the write command in accordance with one embodiment.

As shown in FIG. 21, AFUM controller 220 of host data processing system 100 issues a host write command 2100 (e.g., Host_Wr(Addr,Data)) to an AFUM 222 configured as an attached memory 402 via protocol stack 400 as discussed above with reference to FIG. 4. In the successful case depicted in FIG. 22, AFUM transaction layer 320 communicates a write command corresponding to host write command 1800 (including the real address and write data) to attached memory 402 via AFUM protocol interface layer 322 and AFUM protocol layer 324, where protocol layers 320-324 may all be implemented in AFUM interface 225. In response to the write command, attached memory 402 returns an indication of the success of the write command to AFUM protocol interface layer 322. In response, AFUM protocol interface layer 322 issues to host transaction layer 306 an AFUM write response 2200 indicating success of host write command 2100 (e.g., AFUM_Wr_Resp).

FIG. 23 depicts the case in which a write failure occurs. In this case, attached memory 402 responds to the write command received from AFUM interface 225 with a message indicating failure of the write command. AFUM interface 225 accordingly issues an AFUM write response 2300 indicating a write failure (e.g., AFUM_Wr_Failed).

Figure 24:
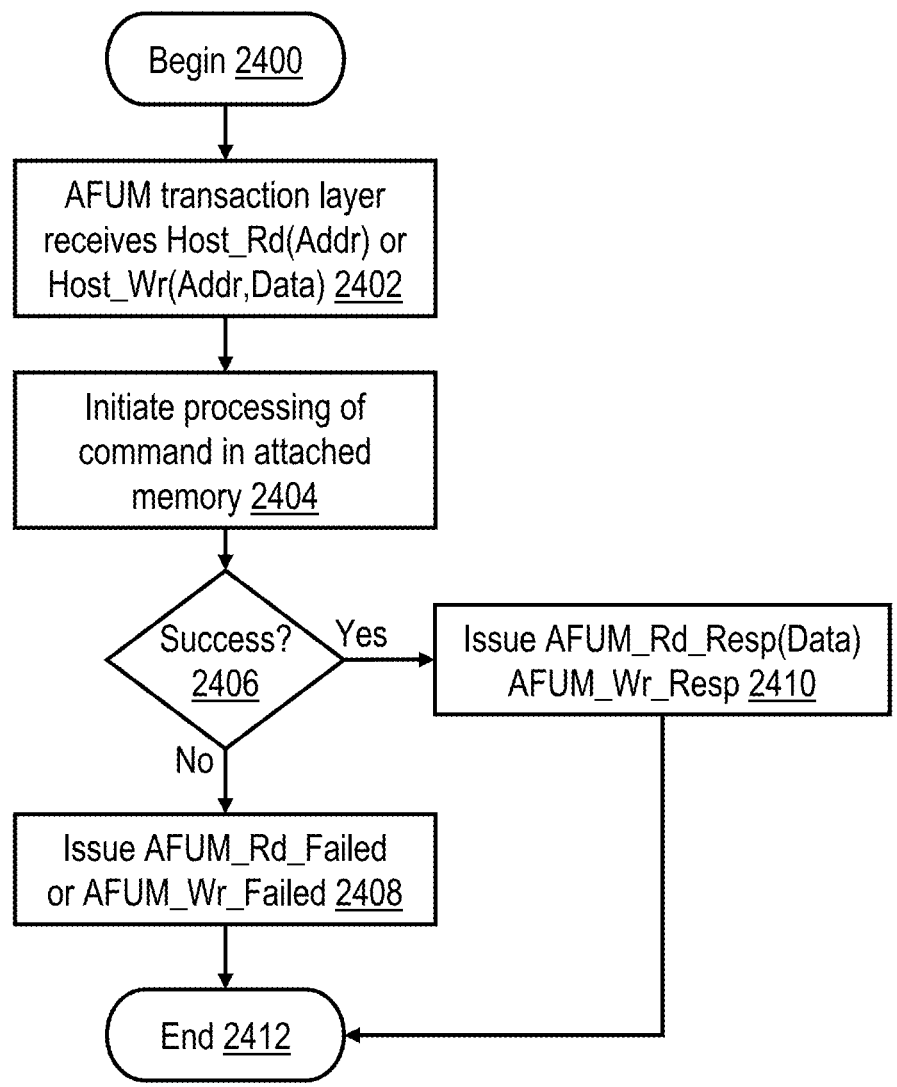
FIG. 24 is a high-level logical flowchart of an exemplary method by which a transaction layer serving an AFUM responds to a command of a host data processing system in accordance with one embodiment.

Referring now to FIG. 24, there is depicted a high-level logical flowchart of an exemplary method by which an AFUM transaction layer 320 serving an AFUM 222 responds to a command of a host data processing system 100 in accordance with one embodiment. The process of FIG. 24 begins at block 2400 and then proceeds to block 2402, which illustrates AFUM transaction layer 320 receiving from AFUM controller 220 either a host read command 1800 (see, e.g., FIG. 18) or a host write command 2100 (see, e.g., FIG. 21). In response to receipt of the host command, AFUM transaction layer 320 initiates processing within attached memory 402 of the read or write operation specified by the host command (block 2404). Depending upon the success or failure of the read or write operation initiated at block 2404, AFUM transaction layer 320 issues an appropriate AFUM response to AFUM controller 220 (block 2406). In particular, in response to success of the host command, AFUM transaction layer 320 issues either a AFUM read response 1900 providing the requested data (e.g., AFUM_Rd_Resp (Data)) or an AFUM write response 2200 indicating success of the write (e.g., AFUM_Wr_Resp), as shown at block 2410. In response to failure of the host command, AFUM transaction layer 320 issues either an AFUM read response 2000 indicating a read failure (e.g., AFUM_Rd_Failed) or an AFUM write response 2300 indicating a write failure (e.g., AFUM_Wr_Failed), as shown at block 2408. Following either block 2408 or block 2410, the process of FIG. 24 ends at block 2412.

Figure 25:
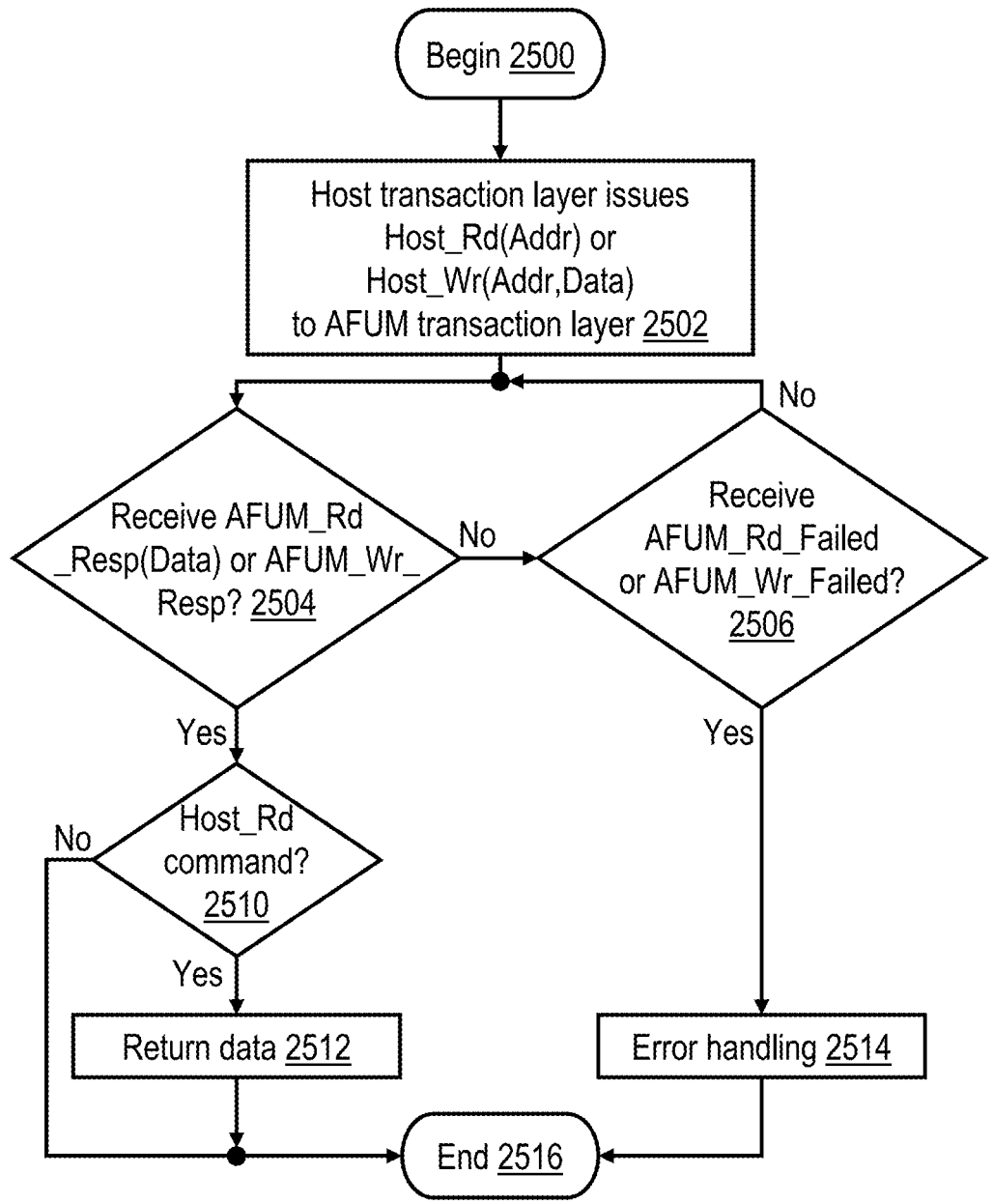
FIG. 25 is a high-level logical flowchart of an exemplary method by which a host transaction layer of a host data processing system issues a command to an AFUM and handles an AFUM response in accordance with one embodiment.

With reference now to FIG. 25, there is illustrated a high-level logical flowchart of an exemplary method by which a host transaction layer 306 handles a command issued to an AFUM 222 configured as an attached memory 402 in accordance with one embodiment. The process of FIG. 25 begins at block 2500 and then proceeds to block 2502, which illustrates host transaction layer 306 issuing a host command, such as a host read command 1800 (e.g., Host_Rd(Addr)) or a host write command 2100 (e.g., Host_Wr(Addr,Data)), to AFUM transaction layer 320. Host transaction layer 306 then monitors for an AFUM response to the host command, as shown at blocks 2504-2506. In response to determining at block 2504 that the AFUM response is an AFUM read response 1900 providing the data requested by host read command 900 (e.g., AFUM_Rd_Resp(Data)) or an AFUM write response 2200 indicating success of a host write command 2100 (e.g., Host_Wr_Resp), the process passes to block 2510. At indicated at block 2510, if the host command issued at block 2502 was a host write command 2100 rather than a host read command 1800, processing by host transaction layer 306 simply ends at block 2516. However, if the host command issued at block 2502 was a host read command 1800 rather than a host write command 2100, host transaction layer 306 returns the requested data to host data processing system 100 (block 2512). Thereafter, the process of FIG. 25 ends at block 2516.

Referring again to block 2504, if the AFUM response received is not an AFUM read response 1900 or an AFUM write response 2200, host transaction layer 306 determines at block 2506 whether or not the AFUM response indicates a read or write failure (e.g., AFUM_Rd_Failed 2000 or AFUM_Wr_Failed 2300). If not, the process returns to block 2504. If, however, host transaction layer 306 determines that the AFUM response indicates a read or write failure, host transaction layer 306 initiates error handling for the failed host command (block 2514). Following block 2514, the process of FIG. 25 ends at block 2516.

The preceding discussion has described in detail a multi-function communication interface that can be utilized to support communication between a host data processing system 100 and an AFUM 222 configured as an attached memory 402 or an AFU 502. It should be appreciated that the communication interface supports simultaneous communication of both host commands initiated by host data processing system 100 and AFUM commands initiated by AFUM 222. The communication interface thus provides a convenient facility that enables communication between host processing system 100 and an attached device that frees the attached device from the requirements of supporting the host bus protocol and/or coherence protocol of host data processing system 100 while still permitting data sharing between the attached device and host data processing system 100. In accordance with one aspect of the inventions disclosed herein, the described communication interface can be extended to enable attachment of two or more host data processing systems for communication, for example, to enable memory sharing between the host data processing systems. In the context of the present application each such "host" is understood to mean, at a minimum, the set of processing and memory resources that form a coherent memory domain in which the processing resources have read and write access to the memory resources absent use of the communication interface disclosed herein. Because the sharing of memory resources by hosts via the communication interface is by definition non-coherent, higher-level software (e.g., operating system or hypervisor software) can optionally determine whether to restrict accesses to overlapping memory regions by different hosts, for example, via memory page protections.

Figure 26:
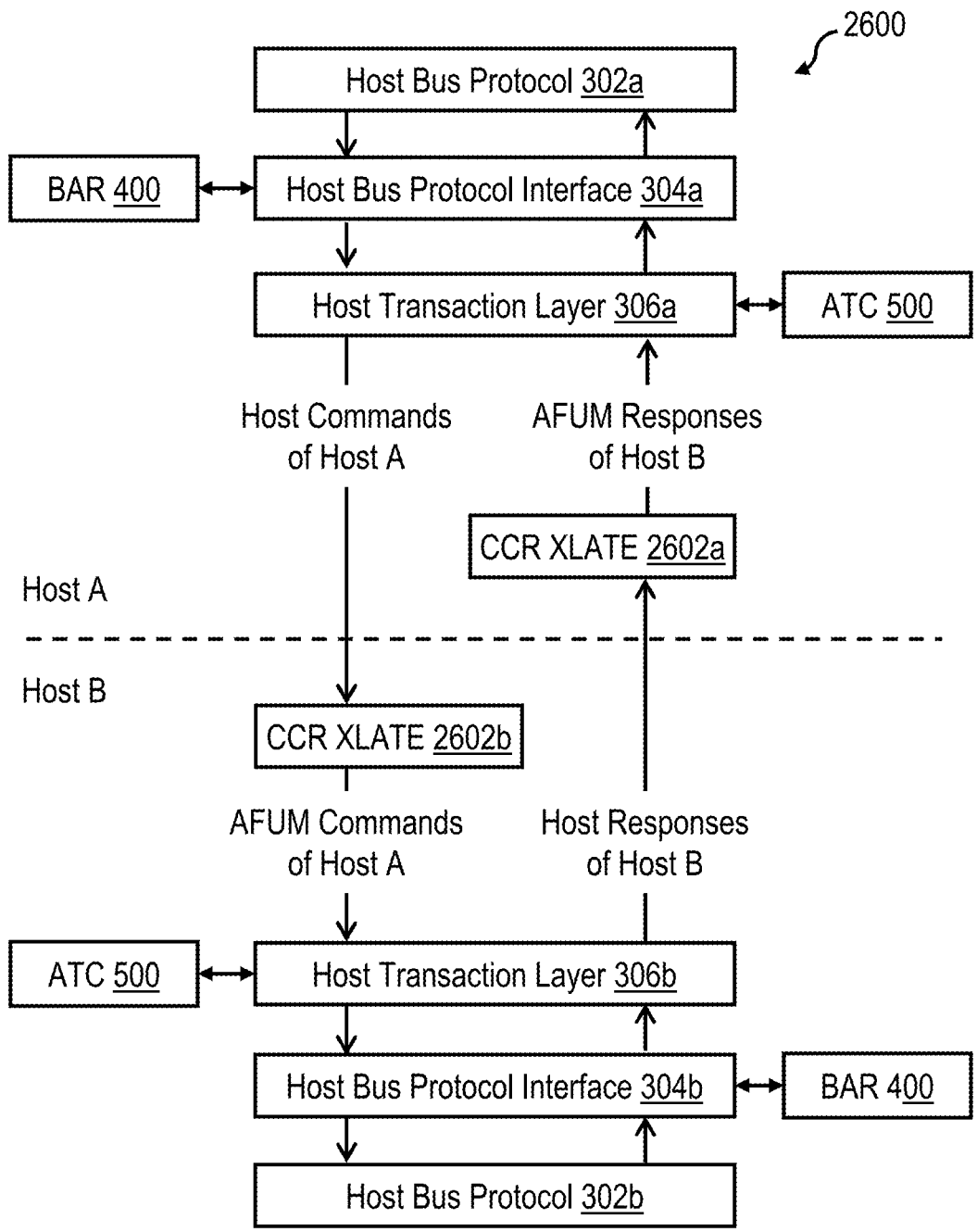
FIG. 26 depicts an exemplary protocol stack for a communication interface configured to support coupling of a host data processing system to another host data processing system to enable memory sharing in accordance with one embodiment.

Referring now to FIG. 26, there is depicted an exemplary protocol stack 2600 for a communication interface configured to support attachment of host data processing system to support memory sharing in accordance with one embodiment. In the depicted embodiment, a first host data processing system 100 (identified as "Host A") is communicatively coupled to a different second host data processing system 100 (identified as "Host B"). As discussed further below, for example, with reference to FIG. 38, the communicative coupling of Host A and Host B can be implemented by directly coupling an AFUM controller 220 within Host A to an AFUM controller 220 within Host B via a communication link. Alternatively or additionally, an AFUM controller 220 within Host A and an AFUM controller 220 within Host B may be communicatively coupled through one or more intervening devices, such as other host data processing system(s), switches, communication links, etc.

As indicated by like reference numerals, the portion of protocol stack 2600 implemented on each of Host A and Host B includes a host bus protocol layer 302a or 302b, host bus protocol interface layer 304a or 304b, and a host transaction layer 306a or 306b, as previously described. Again, these protocol layers (as well as the unillustrated host transaction frame/parse layer 308a-308b, host data layer 310a-310b, and host physical layer 312a-312b) can be implemented within an AFUM controller 220. In addition, each of Host A and Host B includes a command, control and credit, and response translation (CCR XLATE) layer 2602a or 2602b. Seen from the perspective of Host A, CCR XLATE layer 2602b translates inbound host commands initiated by Host A into AFUM commands, thus emulating or making it appear to the receiving host (i.e., Host B) that the initiating host (i.e., Host A) is an AFU 502. Similarly, CCR XLATE layer 2602a translates inbound host responses of the receiving host (i.e., Host B) issued in response to AFUM commands output by CCR XLATE layer 2602b into AFUM responses, thus emulating or making it appear to the initiating host (i.e., Host A) that the receiving host (i.e., Host B) is an attached memory 402. For host commands initiated by Host B, the functions performed by CCR XLATE layers 2602a, 2602b are reversed. Thus, for these host commands, CCR XLATE layer 2602a translates host commands of Host B into AFUM commands (emulating the attachment of an AFU 502 to Host A), and CCR XLATE layer 2602b translates host responses of Host A into AFUM responses (emulating the attachment of an attached memory to Host B). Consequently, host-to-host communication can be seamlessly handled by reusing the existing AFUM communication protocol despite asymmetries between the AFUM and host command and response sets.

As alluded to above, command and response sets implemented by hosts and AFUMs 222 are asymmetric. For example, by comparison of FIGS. 9-10 and 14-15 with FIGS. 19-20 and 22-23, it can be observed that the set of host responses is richer than the set of AFUM responses, particularly in that the set of host responses includes host read and write failure responses 900, 1400, a host translation complete response 902, 1402, and a host translation error response 1002, 1502. The set of AFUM responses simply does not include these or corresponding response messages. As a result, the set of AFUM responses reused in host-to-host communication cannot communicate occurrences of translation errors or page protection faults. Consequently, in a preferred embodiment, the possibility of address translation errors and page protection faults is eliminated by pinning, in the page frame table 210 of the target host, the page table entries referenced by host commands of the initiating host.

Figure 27:
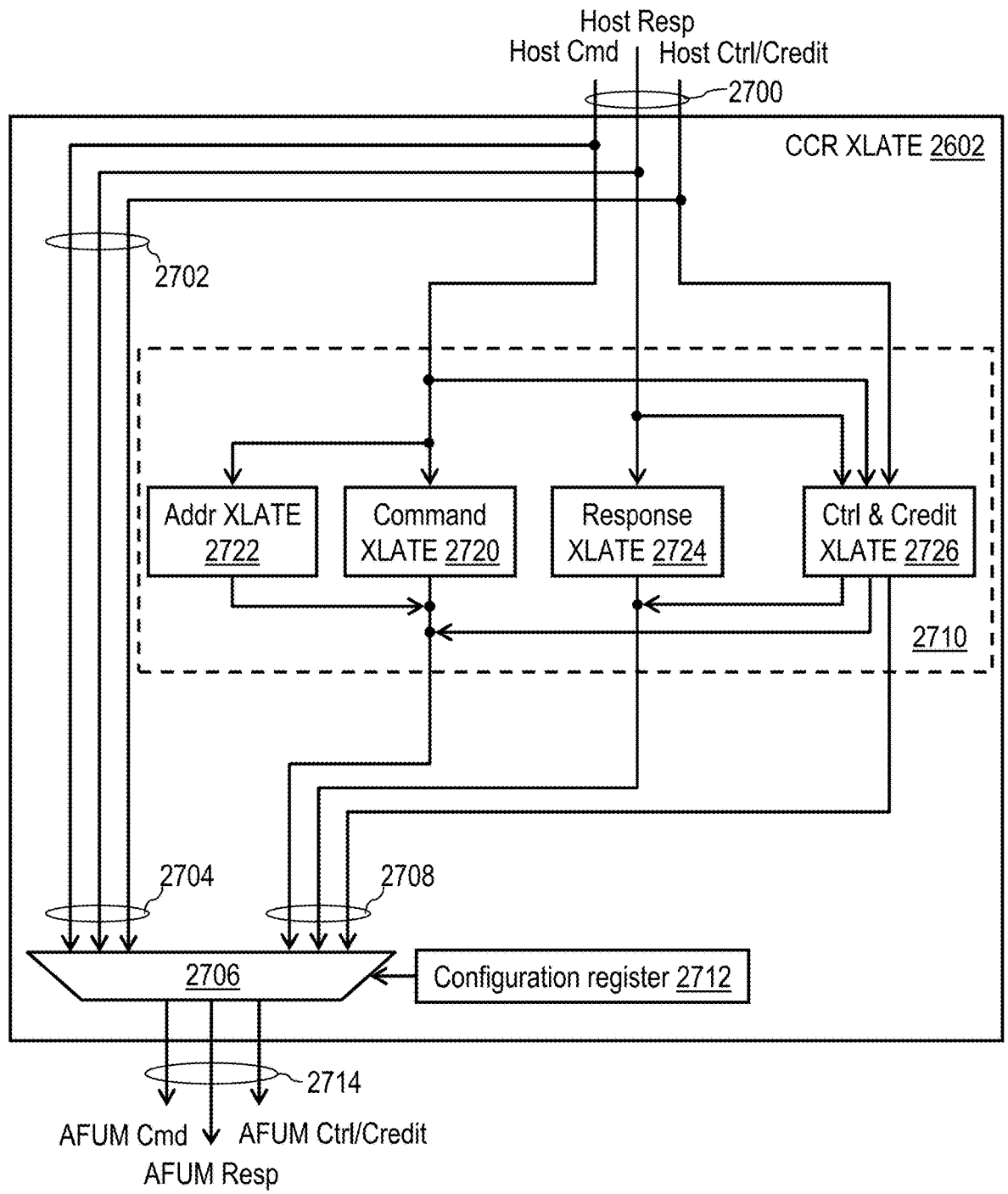
FIG. 27 is a more detailed block diagram of command, control and credit, and response translation (CCR XLATE) layer in the protocol stack of FIG. 26.

With reference now to FIG. 27, there is a more detailed block diagram of a CCR XLATE layer 2602 in protocol stack 2600 of FIG. 26. In this embodiment, CCR XLATE layer 2602, which can be implemented in hardware, software, or a combination of hardware and software, includes layer inputs 2700, which receive host commands, host responses, and host control/credit messages originating from another host data processing system 100. As described above, host commands are utilized, among other things, to initiate read and write access to shared memory, and the host responses provide responses to AFUM commands. The host control/credit messages are utilized, for example, to coordinate flow control of commands and responses between hosts, allocate and release credits employed in a credit-based allocation of communication links, and implement virtual channels. Layer inputs 2700 are coupled via a bypass path 2702 to a first set of inputs 2704 of selection logic, represented in FIG. 27 by a mode multiplexer 2706. Layer inputs 2700 are additionally coupled to translation logic 2710.

In the illustrated embodiment, translation logic 2710 includes command translation (Command XLATE) logic 2720, which translates host commands of an initiating host coupled to AFUM controller 220 into AFUM commands, as discussed in detail below with reference to FIGS. 28-33. In a preferred embodiment, translation logic 2710 is implemented with only combinatorial logic capable of operating at wire speed. Associated with command translation logic 2720 is optional address translation (Addr XLATE) logic 2722, which is capable of translating real addresses specified by host commands. In a particularly preferred embodiment, the address translation performed by address translation logic 2722, if present, is performed without reference to an address translation structure (e.g., an address translation cache or translation lookaside buffer), but is instead directly implemented utilizing combinatorial logic, which may add or subtract an address offset, for example. Translation logic 2710 additionally includes response translation logic 2724, which translates host responses of a receiving host coupled to AFUM controller 220 into AFUM responses, as discussed in detail below with reference to FIGS. 28-33. In addition, translation logic 2710 includes control and credit translation logic 2726, which translates host control and credit messages into AFUM control and credit messages. The outputs of command translation logic 2720, response translation logic 2724, and control and credit logic 2726 are received at a second set of inputs 2708 of mode multiplexer 2706.

Mode multiplexer 2706 selects between the messages presented at its first set of inputs 2704 and second set of inputs 2708 based on the setting of configuration register 2712, which can be initialized, for example, via a memory-mapped input/output (MMIO) operation of a host data processing system 100, to configure CCR XLATE layer 2602. For example, in one example, if an AFUM controller 220 is to be utilized to communicatively couple a host data processing system 100 to an AFUM 222, the setting of configuration register 2712 controls mode multiplexer to select the messages presented at first set of inputs 2704 for forwarding via layer output 2714 to the associated host transaction layer 306. If, however, if AFUM 220 is to be utilized to couple host data processing systems 100 for memory sharing, the setting of configuration register 2712 controls mode multiplexer to select messages presented at the second set of inputs 2708 for forwarding via layer output 2714.

Figure 28:
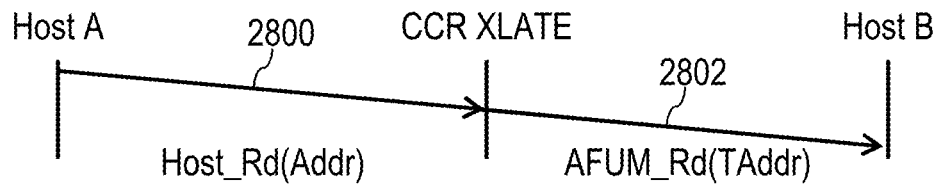
FIG. 28 is a time-space diagram of a read command issued by a host data processing system to an attached host data processing system in accordance with one embodiment.
Figure 29:
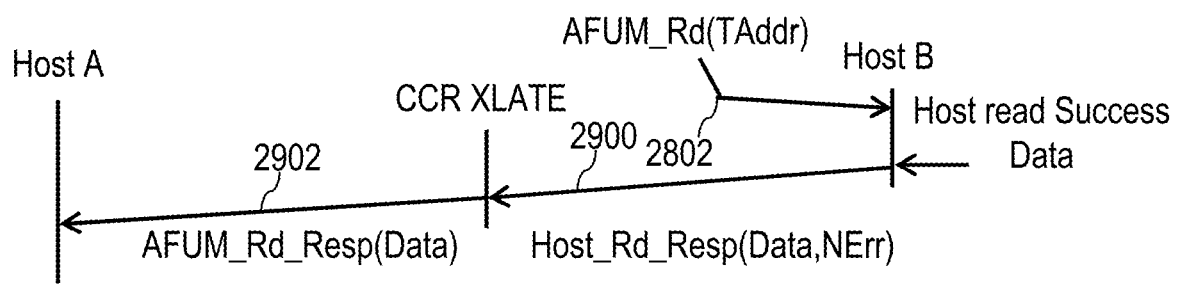
FIGS. 29-30 are time-space diagrams of various responses by an attached host processing system to the read command of another host data processing system in accordance with one embodiment.
Figure 30:
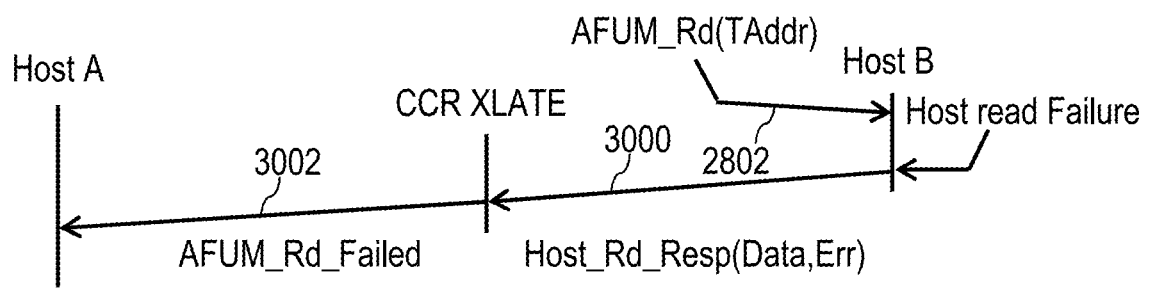

Referring now to FIGS. 28-30, there are depicted a time-space diagram of a read command issued by a first host data processing system (e.g., Host A) to an attached host data processing system (e.g., Host B) via the communication interface provided by coupled AFUM controllers 220 and various responses of the attached host data processing system to the read command in accordance with one embodiment.

As shown in FIG. 28, an AFUM controller 220 of Host A (i.e., the "initiating host") issues a host read command 2800 (e.g., Host_Rd(Addr)) specifying a real address from which data is to be read to an AFUM controller 220 of Host B (i.e., the "receiving host" or "target host"), where the AFUM controllers 220 of both hosts are configured by the setting of configuration register 2712 for host-to-host communication via protocol stack 2600. Responsive to receiving host read command 2800, CCR XLATE layer 2602b of Host B translates host read command 2800, and optionally, the real address specified by host read command 2800. For example, command translation logic 2720 translates host read command 2800 into an AFUM read command 2802 (AFUM_Rd(TAddr)), emulating or making it appear to receiving Host B that AFUM read command 2802 was initiated by an AFU 502 directly attached to AFUM controller 220 of Host B. Optionally, address translation logic 2722 of Host B may translate the real address specified by host read command 2800 to obtain a translated address (TAddr). CCR XLATE layer 2602b then passes this AFUM read command 2802 to host transaction layer 306b of Host B, which processes AFUM read command 2802 as described above with reference to FIG. 16.

In the successful case depicted in FIG. 29, in response to the host bus protocol read request initiated by host transaction layer 306b at block 1636, Host B returns the data requested by AFUM read command 2802 to AFUM controller 220. Host bus protocol interface layer 304b of Host B forwards the requested data to host transaction layer 306b of Host B, which issues a host read response 2900 providing the requested data and indicating no error (e.g., Host_Rd_Resp(Data,NErr)).

Host read response 2900 is received and processed by CCR XLATE layer 2602a of Host A. In response to receipt of host read response 2900, response translation logic 2724 of CCR XLATE layer 2602a translates host read response 2900 into an AFUM read response 2902 (e.g., AFUM_Rd_Resp(Data)), emulating or making it appear from the perspective of Host A that Host A is attached to an attached memory 402. It should be noted that the indication of no error (NErr) provided in host read response 2900 causes response translation logic 2724 to provide an AFUM_Rd_Resp(Data) rather than AFUM_Rd_Failed. CCR XLATE layer 2602a forwards AFUM read response 2902 to host bus protocol interface 304a, which handles AFUM read response 2902 as discussed above with reference to FIG. 25. For example, host bus protocol interface 304a may communicate the requested data to the requesting master (e.g., an L2 cache 230) in Host A utilizing the host bus protocol of Host A. The requesting master may then cache or otherwise process the requested data.

FIG. 30 depicts the case in which a read failure occurs in Host B. In this case, in response to the host bus protocol read request initiated by host transaction layer 306b at block 1636, Host B responds to host bus protocol interface layer 304b of Host B with a message indicating failure of the host bus protocol read request. Host bus protocol interface layer 304b of Host B accordingly issues a host read response 3000 indicating a read failure (e.g., Host_Rd_Resp(Data,Err)). In some implementations, the indication of the read failure can be provided in a data field of host read response 3000.

Host read response 3000 is received and processed by CCR XLATE layer 2602a of Host A. In response to receipt of host read response 3000, response translation logic 2724 of CCR XLATE layer 2602a translates host read response 3000 into an AFUM read response 3002 indicating failure (e.g., AFUM_Rd_Failed). Again, it should be noted that the indication of (Err) provided in host read response 3000 causes response translation logic 2724 to provide an AFUM_Rd_Failed rather than AFUM_Rd_Resp(Data). CCR XLATE layer 2602a forwards AFUM read response 3002 to host bus protocol interface 304a, which initiates error handling as discussed above with reference to block 2514 of FIG. 25.

Figure 31:
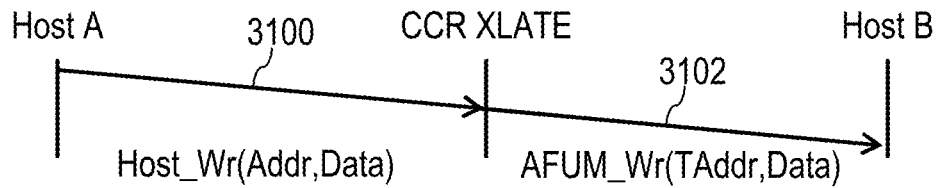
FIG. 31 is a time-space diagram of a write command issued by a host data processing system to an attached host data processing system in accordance with one embodiment.
Figure 32:
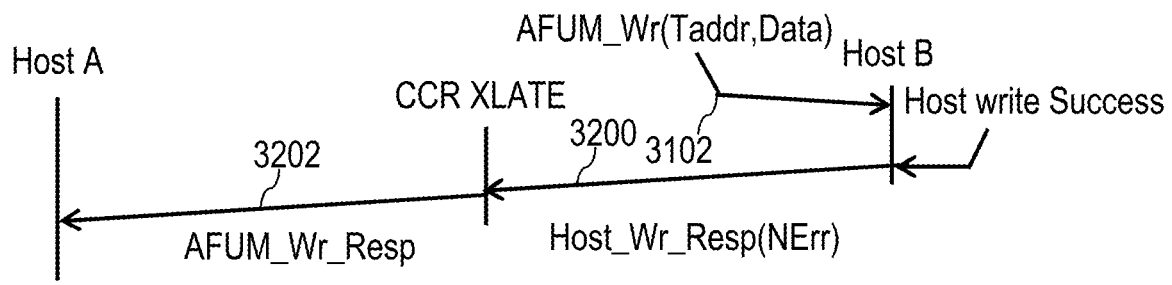
FIGS. 32-33 are time-space diagrams of various responses by an attached host processing system to the write command of another host data processing system in accordance with one embodiment.
Figure 33:
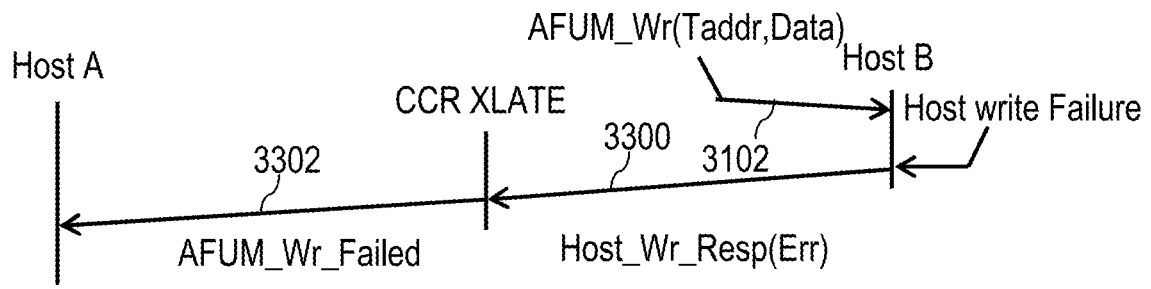

With reference now to FIGS. 31-33, there are illustrated time-space diagrams of a write command issued by a first host data processing system (e.g., Host A) to an attached host data processing system (e.g., Host B) via the communication interface provided by coupled AFUM controllers 220 and various responses of the attached host data processing system to the write command in accordance with one embodiment. As discussed above, the AFUM controllers 220 of both hosts are configured by the setting of configuration register 2712 for host-to-host memory sharing via protocol stack 2600.

As shown in FIG. 31, an AFUM controller 220 of initiating Host A issues a host write command 3100 (e.g., Host_Wr(Addr,Data)) specifying a real address and data is to be written to the real address. Host write command 3100 is issued to an AFUM controller 220 of receiving Host B. Responsive to receiving host write command 3100, CCR XLATE layer 2602b of Host B translates host write command 3100, and optionally, the real address specified by host write command 3100. For example, command translation logic 2720 translates host write command 3100 into an AFUM write command 3102 (AFUM_Wr(TAddr,Data)), emulating or making it appear to receiving Host B that AFUM write command 3102 was initiated by an AFU 502 directly attached to Host B. Optionally, address translation logic 2722 of Host B may translate the real address specified by host write command 3100 to obtain a translated address (TAddr). CCR XLATE layer 2602b then passes this AFUM write command 3102 to host transaction layer 306b of Host B, which processes AFUM write command 3102 as described above with reference to FIG. 16.

In the successful case depicted in FIG. 32, in response to the host bus protocol write request initiated by host transaction layer 306b, for example, as discussed with reference to block 1636 of FIG. 16, Host B performs the requested write, and optionally, returns an indication of success of the write request to AFUM controller 220. (Some host bus protocols provide indications of the success of write requests to requestors, while others do not. And in those that do not, AFUM controller 220 assumes success and provides the appropriate host response.) In response to completion of the write request, host transaction layer 306b of Host B issues a host write response 3200 indicating no error (e.g., Host_Wr_Resp(NErr)).

Host write response 3200 is received and processed by CCR XLATE layer 2602a of Host A. In response to receipt of host write response 3200, response translation logic 2724 of CCR XLATE layer 2602a translates host write response 3200 into an AFUM write response 3202 (e.g., AFUM_Wr_Resp), emulating or making it appear from the perspective of Host A that an attached memory 402 has completed the requested write. It should be noted that the indication of no error (NErr) provided in host write response 3200 causes response translation logic 2724 to provide an AFUM_Wr_Resp rather than AFUM_Wr_Failed. CCR XLATE layer 2602a forwards AFUM write response 3202 to host bus protocol interface 304a, which handles AFUM write response 3202 as discussed above with reference to FIG. 25. For example, host bus protocol interface 304a may communicate success of the requested write to the requesting master (e.g., an L2 cache 230) in Host A utilizing the host bus protocol of Host A. Alternatively, host bus protocol interface 304a may allow or require the write request to complete without issuing any host bus protocol communication on the system fabric of Host A, in which case AFUM write response 3202 can be discarded by host transaction layer 306a.

FIG. 33 depicts the case in which a write failure occurs in Host B. In this case, in response to the host bus protocol write request initiated by host transaction layer 306b at block 1636 of FIG. 16, Host B responds to host bus protocol interface layer 304b of Host B with a message indicating failure of the host bus protocol write request. Host bus protocol interface layer 304b of Host B accordingly issues a host write response 3300 indicating a write failure (e.g., Host_Wr_Resp(Err)).

Host write response 3300 is received and processed by CCR XLATE layer 2602a of Host A. In response to receipt of host write response 3300, response translation logic 2724 of CCR XLATE layer 2602a translates host write response 3300 into an AFUM write response 3302 indicating failure (e.g., AFUM_Wr_Failed). Again, it should be noted that the indication of (Err) provided in host write response 3300 causes response translation logic 2724 to provide an AFUM_Wr_Failed rather than AFUM_Wr_Resp. CCR XLATE layer 2602a forwards AFUM write response 3302 to host bus protocol interface 304a, which initiates error handling as discussed above with reference to block 2514 of FIG. 25.

Figure 34:
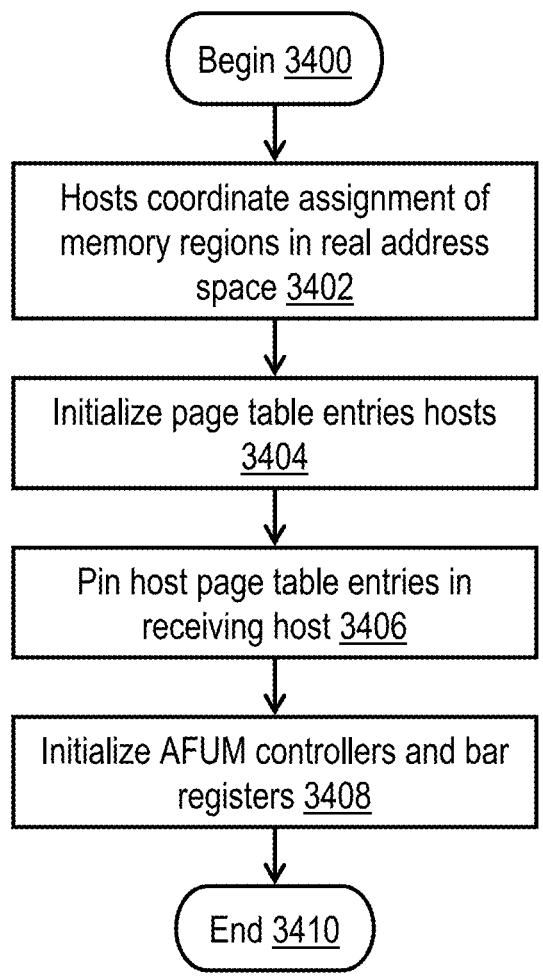
FIG. 34 is a high-level logical flowchart of an exemplary process for initializing data processing systems to share memory in accordance with one embodiment.

Referring now to FIG. 34, there is depicted a high-level logical flowchart of an exemplary process for initializing data processing systems to share memory in accordance with one embodiment. The process of FIG. 34 begins at block 3400 and then proceeds to block 3402, which illustrates the host data processing systems 100 (e.g., Host A and Host B) that are coupled for memory sharing coordinating their respective assignments of memory regions in the real address space. For example, this coordination can be implemented by hypervisor and/or operating system software executing on one or both of the host data processing systems 100. In addition, each of the host data processing systems 100 initializes the page table entries 212 within its page frame table 210 to provide effective-to-real address translation on each of the hosts (block 3404).

As further indicated at block 3406, host data processing systems 100 communicate with each other (e.g., via hypervisor software) to pin, within the system memory 108 of each host data processing system 100 serving in the role of a receiving (or target) host, any page table entries 212 that serve to translate real addresses that may be specified by host commands of an initiating host (block 3406). Each host data processing system 100 additionally initializes its respective AFUM controllers 220 and appropriate bar registers 216, 224 (block 3408). As noted above, the initialization of AFUM controllers 220 includes setting configuration registers 2712 to indicate host-to-host communication via AFUM controllers 220. Initialization of BAR registers 216, 224 causes host bus protocol memory access requests (e.g., reads, writes, etc.) on the system fabrics of the hosts to be appropriately routed, either via a memory controller 106 to a local system memory 108 within the host or via an AFUM controller 220 to a receiving host. Following block 3408, the process of FIG. 34 ends at block 3410.

Figure 35:
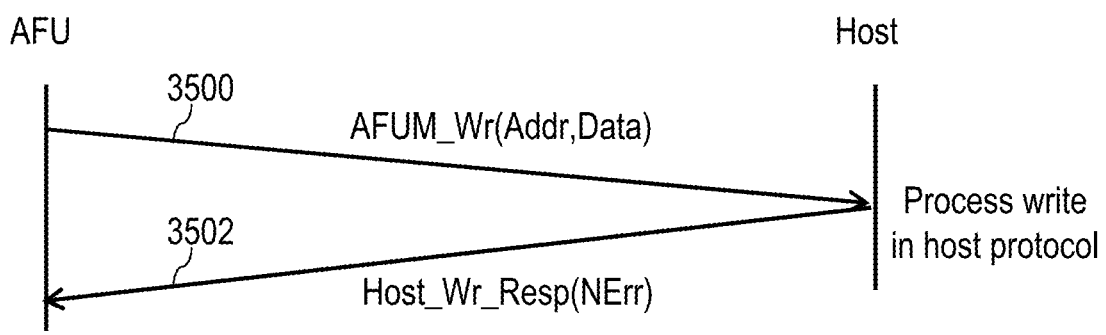
FIG. 35 is a time-space diagram of a write command issued by an AFU to a host data processing system and an associated response of the host data processing system in accordance with one embodiment implementing a fast write response mode.

With reference now to FIG. 35, there is illustrated a time-space diagram of a write command issued by an AFU 502 to a host data processing system 100 and an associated response of the host data processing system 100 in accordance with one embodiment employing a fast response write mode. As discussed above with reference to FIG. 11, AFU 502 issues an AFUM write command 1100 (e.g., AFUM_Wr(Addr,Data)) to a host data processing system 100 via protocol stack 500 of FIG. 5. In the prior embodiment discussed above with reference to FIGS. 12-13, a host bus protocol write request corresponding to AFUM write command 1100 is processed in the receiving host data processing system 100 prior to host transaction layer 306 providing a host write response 1200 or 1300 to AFU 502. In contrast, an AFUM controller 220 configured to operate in the fast response write mode depicted in FIG. 35 instead responds to AFUM write command 3500 with a host write response 3502 indicating no error (e.g., Host_Wr_Resp(NErr)) possibly prior to and without regard to processing of the host bus protocol write request within the receiving host data processing system 100. Issuing host write response 3502 without regarding to success or failure of the host bus protocol write means that the translation/permission failure cases depicted in FIGS. 14-15 are not permitted to occur. To prevent these failure cases, the relevant PTEs 212 are pinned in the receiving host.

Figure 36:
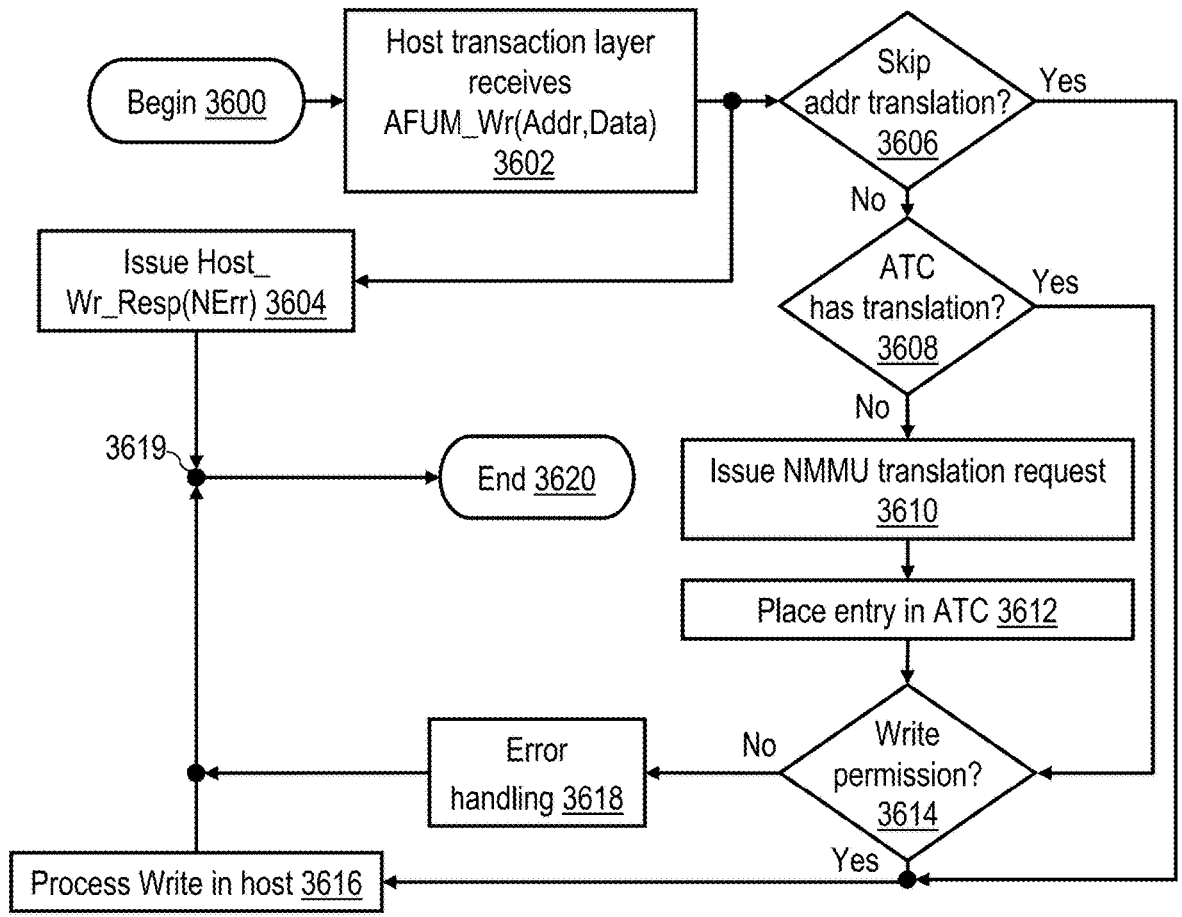
FIG. 36 is a high-level logical flowchart of an exemplary method by which a host transaction layer of a host data processing system responds to an AFUM write command in accordance with one embodiment.

Referring now to FIG. 36, there is depicted a high-level logical flowchart of an exemplary method by which a host transaction layer 306 of an AFUM controller 220 responds to a write command in accordance with the fast response write mode illustrated in FIG. 35. The process of FIG. 36 begins at block 3600 and then proceeds to block 3602, which illustrates a host transaction layer 306 of a AFUM controller 220 configured to operate in the fast response write mode receiving an AFUM write command 3500 (e.g., AFUM_Wr(Addr,Data)). Following block 3602, the process of FIG. 36 bifurcates and proceeds in parallel to blocks 3604 and 3606. Block 3604 depicts host transaction layer 306 of a AFUM controller 220 issuing a host response 3502 indicating no error (e.g., Host_Wr_Resp(NErr)) prior to processing of a host bus protocol write request corresponding to AFUM write command 3500 within the receiving host data processing system 100 and without regard to the processing of the host bus protocol write request. The process then proceeds from block 3604 to join point 3619.

Referring to block 3606, host transaction layer 306 determines whether or not to skip translation the effective address specified in AFUM write command 3500 and enforcement of write permission. Host transaction layer 306 can determine to skip translation of the effective address and enforcement of write permission, for example, based on the effective address of the AFUM command falling within a predetermined address range, an indication provided in the AFUM command, and/or a configuration of AFUM controller 220. In response to an affirmative determination at block 3606, the process proceeds to block 3616, which is described below. Otherwise, the process passes to block 3608. It should be appreciated that if a determination is made at block 3606 to skip address translation and enforcement of write permission, other unillustrated techniques, including appropriate configuration of page frame table 210, are utilized to guarantee that the effective address is within a permitted address range and has the required write permission.

Block 3608 illustrates host transaction layer 306 determining whether or not ATC 226 holds an address translation entry for translating the effective address specified in AFUM write command 3500 into a real address. In response to host transaction layer 306 determining that its ATC 226 holds the relevant address translation entry, the process proceeds to block 3614, which is described below. If, on the other hand, host transaction layer 306 determines that its ATC 226 does not hold the relevant address translation entry, host transaction layer 306 initiates transmission to NMMU 228, via host bus protocol interface layer 304 and host bus protocol layer 302, of a NMMU translation request for the effective address specified by AFUM write command 3500 (block 3610). With the relevant page table entry 212 pinned in system memory 108 as discussed above with reference to block 3406 of FIG. 34, NMMU 228 will succeed in obtaining the required translation entry and in supplying the requested address translation entry to AFUM controller 220 for installation into ATC 226 (block 3612).

At block 3614, host transaction layer 306 protects against write protection errors by determining whether or not the address translation entry for the effective address specified by host write command 3500 indicates write permission for the effective address specified by AFUM write command 3500. If so, host transaction layer 306 initiates processing of the write operation specified by AFUM write command 3500 within host data processing system 100 by causing issuance of the appropriate host bus protocol write request on the system fabric via host bus protocol interface layer 304 and host bus protocol layer 302 (block 3616). If, however, host transaction layer 306 determines at block 3614 that the address translation entry does not provide write permission for the effective address specified by AFUM write command 3500, host transaction layer 306 initiates error handling, as shown at block 3618. Following block 3616 or block 3618, the process of FIG. 36 passes to join point 3619. Once both legs of the process of FIG. 36 converge at block 3619, the process of FIG. 36 ends at block 3620.

Upon review of the fast response write mode detailed in FIGS. 35-36 in comparison with the alternative write mode depicted in FIGS. 11-13, it should be understood that a design tradeoff can be made between the allocation of communication resources (e.g., command queues, communication credits, virtual channels, etc.) to the write command and the availability of information regarding whether or not a host bus protocol write request is successfully completed at the receiving host data processing system 100. In particular, early issuance of host write response 3502 without regard to the success or failure of a write operation at the receiving host data processing system 100 enables the initiating participant (e.g., an AFU 502) to release its resources allocated to the write command more quickly and thus frees those resources for earlier allocation to other commands. In the case of an AFU 502 directly attached to an AFUM controller 220, this timing difference between the different write modes may not be significant enough to warrant loss of information regarding success or failure of the write operation in the receiving host data processing system 100. However, in implementations in which AFUM controllers 220 are coupled for host-to-host memory sharing (particularly over multiple hops), use of the fast response write mode can advantageously free communication resources of the initiating data processing system 100 (and any data processing systems 100 intervening between the initiating and receiving data processing systems 100), reducing errors and/or performance problems resulting from the exhaustion of such communication resources and simplifying complexity of the design.

Figure 37:
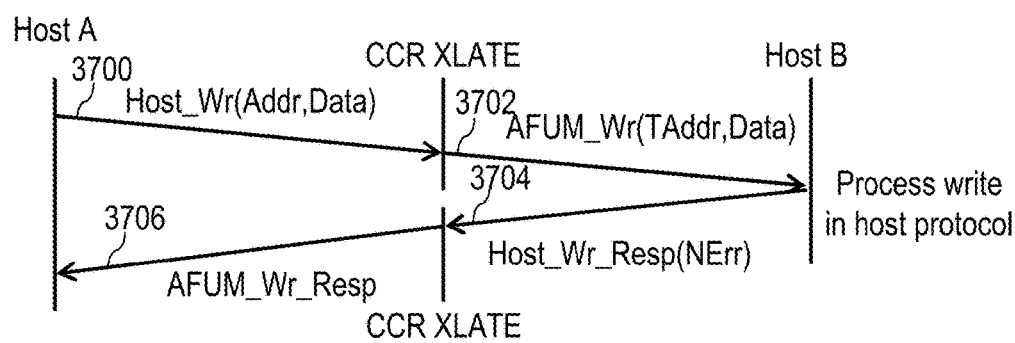
FIG. 37 is a time-space diagram of a write command issued by one host data processing system to another host data processing system and an associated write response in accordance with one embodiment implement a fast write response mode.

FIG. 37 is a time-space diagram of a write command issued by one host data processing system to another host data processing system and an associated write response in accordance with one embodiment employing the fast write response mode and protocol stack 2600 of FIG. 26 discussed above.

As shown in FIG. 37, an AFUM controller 220 of initiating Host A issues a host write command 3700 (e.g., Host_Wr(Addr,Data)) specifying a real address and data to be written to the specified real address. Host write command 3700 is issued to an AFUM controller 220 of receiving Host B. Responsive to receiving host write command 3700, CCR XLATE layer 2602b of Host B translates host write command 3700, and optionally, the real address specified by host write command 3700. For example, command translation logic 2720 translates host write command 3700 into an AFUM write command 3702 (AFUM_Wr(TAddr,Data)), emulating or making it appear to receiving Host B that AFUM write command 3702 was initiated by an AFU 502 directly attached to AFUM controller 220 of Host B. Optionally, address translation logic 2722 of Host B may translate the real address specified by host write command 3700 to obtain a translated address (TAddr). CCR XLATE layer 2602 then passes this AFUM write command 3702 to host transaction layer 306b of Host B, which processes AFUM write command 3702 as described above with reference to FIG. 16. This processing includes the initiation of a host bus protocol write request on the system fabric of Host B to write the data, for example, into system memory 108.

Instead of awaiting the conclusion of the host bus protocol write request to provide a host response, host transaction layer 306b responds to AFUM write command 3500 with a host write response 3704 indicating no error (e.g., Host_Wr_Resp(NErr)) possibly prior and without regard to processing of the host bus protocol write request within the receiving host data processing system 100. Host write response 3704 is received and processed by CCR XLATE layer 2602a of Host A. In response to receipt of host write response 3704, response translation logic 2724 of CCR XLATE layer 2602a translates host write response 3704 into an AFUM write response 3706 (e.g., AFUM_Wr_Resp), emulating or making it appear from the perspective of Host A that an attached memory 402 has completed the requested write. CCR XLATE layer 2602a forwards AFUM write response 3706 to host bus protocol interface 304a, which handles AFUM write response 2706 as discussed above with reference to FIG. 25. For example, host bus protocol interface 304a may communicate success of the requested write to the requesting master (e.g., an L2 cache 230) in Host A utilizing the host bus protocol of Host A. Alternatively, if permitted or required by the host bus protocol of Host A, host bus protocol interface 304a may allow the write request to complete without issuing any host bus protocol communication on the system fabric of Host A, in which case AFUM write response 3706 can be discarded by host transaction layer 306a.

Figure 38:
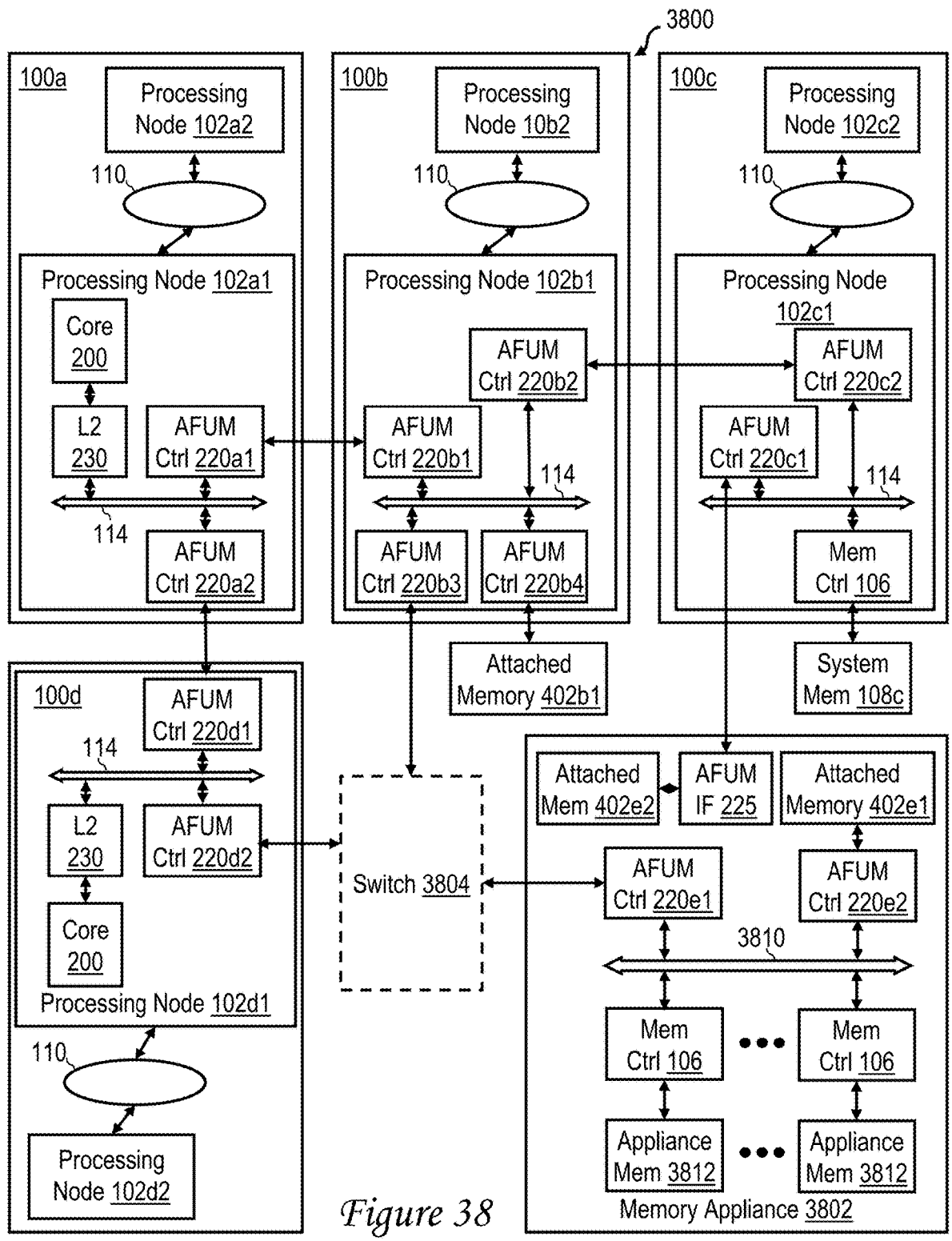
FIG. 38 is a high-level block diagram of an exemplary topology of a data processing environment in which a plurality of host data processing systems are coupled to permit sharing of the memories of the host data processing systems and/or memory in a memory appliance in accordance with one embodiment.

As alluded to above, host-to-host memory sharing is not limited to the interconnection of two hosts, but can instead be extended to any desired number of participating host processing systems 100 and may utilize a large number of differing connection topologies. For example, FIG. 38 depicts a high-level block diagram of an exemplary topology of a data processing environment in which a plurality of host data processing systems 100 are communicatively coupled to support memory sharing. As explained below, the memory shared among the coupled data processing systems 100 can include a variety of different types of memory, for example, memory provided by system memories 108 of host data processing systems 100, by attached memories 402, and/or by a memory appliance. It should be understood that FIG. 38 omits illustration of many components of the illustrated host data processing systems 100 in order to avoid unnecessarily obscuring inventive details.

In the illustrated example, data processing environment 3800 includes four host data processing systems 100a, 100b, 100c, and 100d, each including multiple processing nodes 102 as previously described with reference to FIGS. 1-2. In this example, each host data processing system 100 includes at least two processing nodes. Thus, host data processing system 100a includes at least processing nodes 102a1-102a2, host data processing system 100b includes at least processing nodes 102b1-102b2, host data processing system 100c includes at least processing nodes 102c1-102c2, and host data processing system 100d includes at least processing nodes 102d1-102d2. In this example, one or more of the processing nodes 102 of each host processing system 100 include one or more AFUM controllers 220. For example, processing node 102a1 of host data processing system 100a includes AFUM controllers 220a1 and 220a2, processing node 102b1 of host data processing system 100b includes AFUM controllers 220b1-220b4, processing node 102c1 of host data processing system 100c includes AFUM controllers 220c1 and 220c2, and processing node 102d1 of host data processing system 100d includes AFUM controllers 220d1 and 220d2. To support host-to-host memory sharing, AFUM controller 220a2 of host processing node 100a is coupled to AFUM controller 220d1 of host processing node 100d, AFUM controller 220a1 of host processing node 100a is coupled to AFUM controller 220b1 of host processing node 100b, and AFUM controller 220b2 of host processing node 100b is coupled to AFUM controller 220c2 of host processing node 100c. Thus, each host data processing system 100 is communicatively coupled to each other of host data processing systems 100a-100d via one or more hops. Although in at least some embodiments it would be preferable to avoid the cost and complexity of other mechanisms to communicatively couple host data processing systems 100, it should be appreciated that host data processing systems 100 may optionally be coupled by other additional means, such as a switch 3804, which in the illustrated embodiment is coupled to AFUM controller 220d2 of host data processing system 100d and AFUM controller 220b3 of host data processing system 100b.

Data processing environment 3800 additionally includes a memory appliance 3802, which provides a high capacity memory tank available for sharing by all of host data processing systems 100 in data processing environment

3800. In this example, memory appliance 3802 includes a host bus 3810 supporting the attachment of a plurality of memory controllers 106 each supporting a respective appliance memory 3812. Memory appliance 3802 additionally includes an AFUM controller 220e1 coupled for communication between switch 3804 and host bus 3810 and an AFUM controller 220e2 coupled for communication between host bus 3810 and attached memory 402e1. Memory appliance 3802 also includes an AFUM interface 225 to which an attached memory 402e2 is attached.

To reduce cost and complexity, memory appliance 3802 preferably omits processing nodes 102 for general purpose processing (but may include a service processor, for example). Memory appliance 3802 preferably includes an unillustrated pinned page frame table 210 stored within one or more of appliance memories 3812 and into which PTEs 212 can be written by host data processing systems 100, for example, utilizing AFUM write commands. Memory appliance 3802 additional preferably includes or is communicatively coupled to an NMMU 228 (not illustrated) in order to obtain any address translation entries needed to translate addresses specified in incoming commands.

As noted above, the depicted data processing system environment 3800 supports shared read and write access to any of the variety of memory types within data processing system environment 3800 by requestors in any of host data processing systems 100 via the described communication interface. For example, once host data processing systems 100a-100d, memory appliance 3802, and the communication links coupling them are configured and enabled as described in FIG. 34, each host data processing system 100 can access its own system memory 108 or the system memory 108 of any of the other host data processing systems 100, as represented by system memory 108c of host data processing system 100c. Similarly, each host data processing system 100 can access its own attached memory 402 or the attached memory 402 of any of the other host data processing systems 100 or memory appliance 3802, as represented by attached memory 402b1 of host data processing system 100b and attached memories 402e1-402e2 in memory appliance 3082. Further, each host data processing system 100 can access appliance memory 3812 of memory appliance 3802.

When host-to-host access is made to shared memory in data processing system environment 3800 via one or more intervening hosts, the flow of multi-hop commands and responses is the same as previously described, except that communication of commands and response across the intervening hosts (hops) is facilitated utilizing the host bus protocol of the intervening hosts. In certain cases, the native host bus protocol of a host data processing system 100 may not provide a set of commands and responses sufficient to convey all commands and responses employed in the described host-to-host memory sharing. In such cases, the host bus protocol is preferably augmented as needed to support the described communication of host bus protocol commands and responses. Of course, in alternative embodiments, a host bus protocol more directly compatible with the described commands and responses can be implemented. Support for multi-hop memory access as described may also require implementation of virtual channels by the host bus protocol of the system fabric of the host data processing systems and on the communication links between AFUM controllers 220 in order to avoid deadlocks. The implementation of such virtual channels is known to those skilled in the art.

Figure 39:
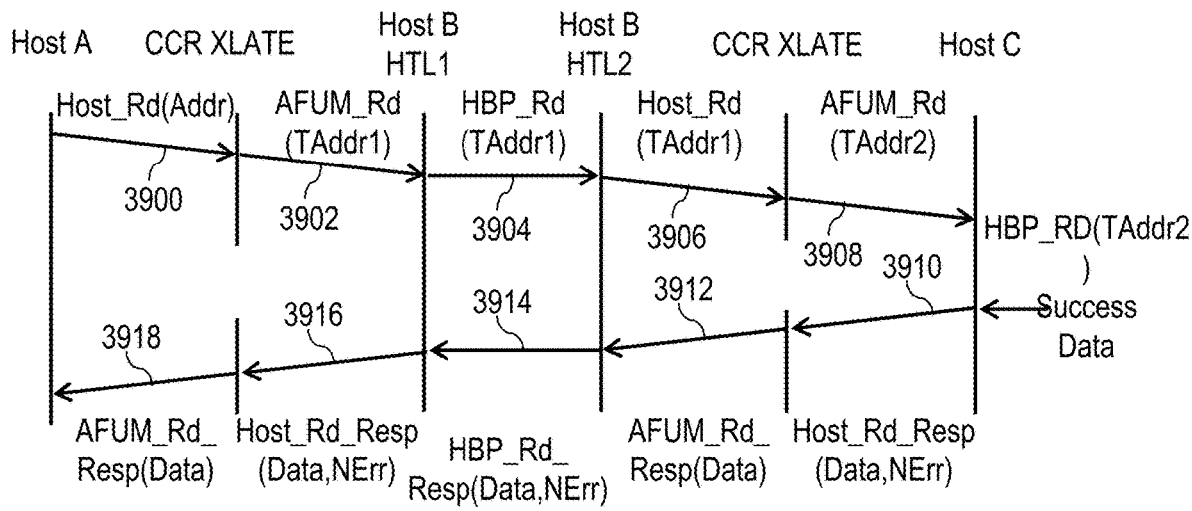
FIG. 39 is a time-space diagram of a multi-hop read command issued by an initiating host data processing system to a receiving host data processing system via an intervening host data processing system and an associated response in accordance with one embodiment.
Figure 40:
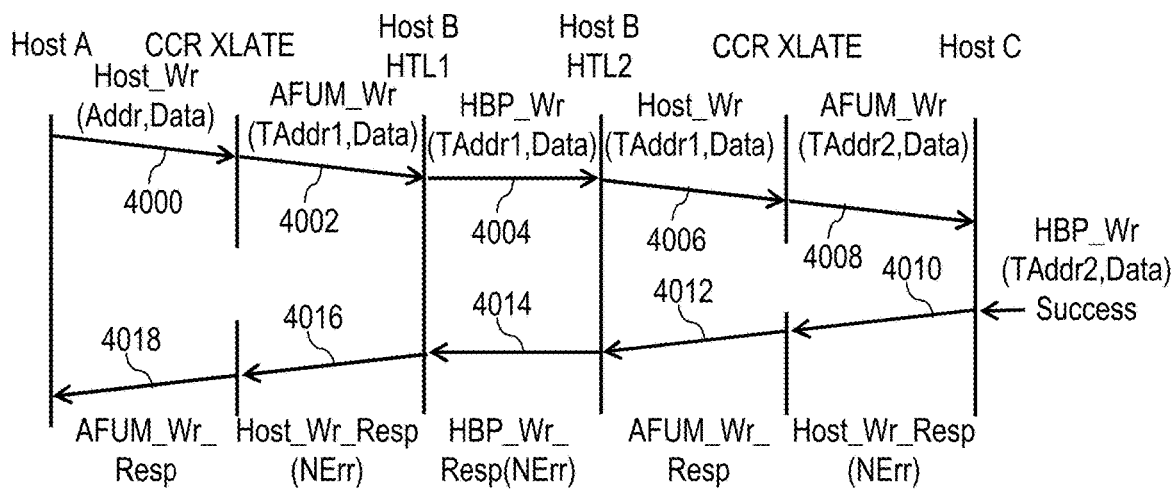
FIG. 40 is a time-space diagram of a multi-hop write command issued by an initiating host data processing system to a receiving host data processing system via an intervening host data processing system and an associated response in accordance with one embodiment.
Figure 41:
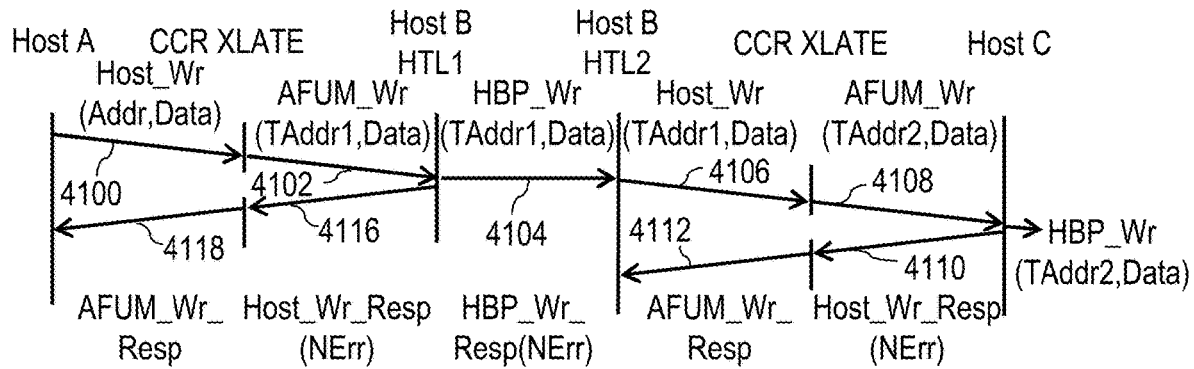
FIG. 41 is a time-space diagram of a multi-hop write command issued by an initiating host data processing system to a receiving host data processing system via an intervening host data processing system and an associated response in accordance with another embodiment.

To illustrate the flow of multi-hop commands and responses, a multi-hop host read command and response corresponding to FIGS. 28-29 are given in FIG. 39, a multi-hop host write command and response corresponding to FIGS. 31-32 are given in FIG. 40, and a multi-hop host write command and response corresponding to FIG. 37 are given in FIG. 41. Data flows illustrating error cases (e.g., corresponding to the one hop error cases depicted in FIGS. 30 and 33) are omitted for brevity, but those skilled in the art will readily appreciate the implementation of these data flows from the following discussion.

With reference now to FIG. 39, there is illustrated a time-space diagram of a multi-hop read command issued by an initiating host data processing system to a receiving host data processing system via an intervening host data processing system and an associated response in accordance with one embodiment.

In the example of FIG. 39, an L2 cache 230 initiates a host bus protocol read request (not shown) on the system fabric of host data processing system 100a. The host bus protocol read request specifies a real address identifying data requested by the associated processor core 200. In this example, the requested data resides in a system memory 108 of host data processing system 100c. In response to receiving the host bus protocol read request, AFUM controller 220a1 of host data processing system 100a determines by reference to its BAR 224 that it is responsible for the real address of the host bus protocol read request and accordingly issues a host read command 3900 (e.g., Host_Rd (Addr)) to AFUM controller 220b1 of host data processing system 100b. Responsive to receiving host read command 3900, CCR XLATE layer 2602 of AFUM controller 220b1 translates host read command 3900, and optionally, the real address specified by host read command 3900 to obtain AFUM read command 3902 (AFUM_Rd(TAddr1)). CCR XLATE layer 2602 of AFUM controller 220b1 then passes AFUM read command 3902 to host transaction layer 306 of AFUM controller 220b1, which initiates a host bus protocol read request 3904 (e.g., HBP_Rd(TAddr1)) on the system fabric of host data processing system 100b.

In response to receipt of host bus protocol read request 3904 on the system fabric of host data processing system 100b, AFUM controller 220b2 of host data processing system 100b determines by reference to its BAR 224 that it is responsible for the real address of the host bus protocol read request 3904 and accordingly issues a host read command 3906 (e.g., Host_Rd(TAddr1)) to AFUM controller 220c2 of host data processing system 100c. Responsive to receiving host read command 3906, CCR XLATE layer 2602 of AFUM controller 220c2 translates host read command 3906, and optionally, the translated real address specified by host read command 3906 to obtain AFUM read command 3908 (e.g., AFUM_Rd(TAddr2)). CCR XLATE layer 2602 of AFUM controller 220c2 then passes this AFUM read command 3908 to host transaction layer 306 of AFUM controller 220c2, which in turn initiates a host bus protocol read request on the system fabric of host data processing system 100c. For example, the host bus protocol read request may request data stored within system memory 108c. In this case, a match between the real address specified by the host bus protocol read request and an address range specified by a BAR 216 of memory controller 106 will cause the memory controller 106 to access the requested data within system memory 108c and deliver the requested data back to AFUM controller 220c2.

In response to receipt of the requested data, host transaction layer 306 of AFUM controller 220c2 issues a host read response 3910 providing the requested data and indicating no error (e.g., Host_Rd_Resp(Data,NErr)). Host read response 3910 is received and processed by CCR XLATE layer 2602 of AFUM controller 220b2 of host data processing system 100b. In response to receipt of host read response 3910, CCR XLATE layer 2602 of AFUM controller 220b2 translates host read response 3910 into an AFUM read response 3912 (e.g., AFUM_Rd_Resp(Data)) and forwards AFUM read response 3912 to host bus protocol interface layer 304 of AFUM controller 220b2. In response, host bus protocol interface layer 304 in turn initiates a host bus protocol read response 3914 (e.g., HBP_Rd_Resp(Data, NErr)) on the system fabric of host data processing system 100b. In response to receipt of host bus protocol read response 3914, host transaction layer 306 of AFUM controller 220b1 issues a host read response 3916 providing the requested data and indicating no error (e.g., Host_Rd_Resp(Data,NErr)). Host read response 3916 is received and processed by CCR XLATE layer 2602 of AFUM controller 220a1 of host data processing system 100a. In response to receipt of host read response 3916, CCR XLATE layer 2602 translates host read response 3916 into an AFUM read response 3918 (e.g., AFUM_Rd_Resp(Data)) and forwards AFUM read response 3918 to host bus protocol interface layer 304 of host data processing system 100a. In response, host bus protocol interface layer 304 in turn initiates an unillustrated host bus protocol read response (e.g., HBP_Rd_Resp(Data, NErr)) on the system fabric of host data processing system 100a, which delivers the requested data to the original requestor (e.g., L2 cache 230).

Referring now to FIG. 40, there is depicted a time-space diagram of a multi-hop write command issued by an initiating host data processing system to a receiving host data processing system via an intervening host data processing system and an associated response in accordance with one embodiment.

In the example of FIG. 40, an L2 cache 230 initiates an unillustrated host bus protocol write request on the system fabric of host data processing system 100a. The host bus protocol write request specifies a real address and data to be written to the real address. In response to receiving the host bus protocol write request, AFUM controller 220a1 determines by reference to its BAR 224 that it is responsible for the real address of the host bus protocol write request and accordingly issues a host write command 4000 (e.g., Host_Wr(Addr,Data)) to AFUM controller 220b1 of host data processing system 100b. Responsive to receiving host write command 4000, CCR XLATE layer 2602 of AFUM controller 220b1 translates host write command 4000, and optionally, the real address specified by host write command 4000 to obtain AFUM write command 4002 (AFUM_Wr(TAddr1,Data)). CCR XLATE layer 2602 of AFUM controller 220b1 then passes AFUM write command 4002 to host transaction layer 306 of AFUM controller 220b1, which initiates a host bus protocol write request 4004 (e.g., HBP_Wr(TAddr1,Data)) on the system fabric of host data processing system 100b.

In response to receipt of host bus protocol write request 4004 on the system fabric of host data processing system 100b, AFUM controller 220b2 determines by reference to its BAR 224 that it is responsible for the real address of the host bus protocol write request 4004 and accordingly issues a host write command 4006 (e.g., Host_Wr(TAddr1,Data)) to AFUM controller 220c2 of host data processing system 100c. Responsive to receiving host write command 4006, CCR XLATE layer 2602 of AFUM controller 220c2 translates host write command 4006, and optionally, the translated real address specified by host write command 4006 to obtain AFUM write command 4008 (e.g., AFUM_Wr(TAddr2,Data)). CCR XLATE layer 2602 of AFUM controller 220c2 then passes this AFUM write command 4008 to host transaction layer 306 of AFUM controller 220c2, which in turn initiates a host bus protocol write request on the system fabric of host data processing system 100c. For example, the host bus protocol write request may request the data payload to be stored within system memory 108c. In this case, a match between the real address specified by the host bus protocol write request and an address range specified by a BAR 216 of memory controller 106 will cause the memory controller 106 to store the data payload of the host bus protocol write request within system memory 108c.

In response to successful completion of the host bus protocol write request within host data processing system 100c (which may or may not be acknowledged by a response on the system fabric of host data processing system 100c), host transaction layer 306 of AFUM controller 220c2 in host data processing system 100c issues a host write response 4010 indicating no error (e.g., Host_Wr_Resp(NErr)). Host write response 4010 is received and processed by CCR XLATE layer 2602 of AFUM controller 220b2 of host data processing system 100b. In response to receipt of host write response 4010, CCR XLATE layer 2602 of AFUM controller 220b2 translates host write response 4010 into an AFUM write response 4012 (e.g., AFUM_Wr_Resp) and forwards AFUM write response 4012 to host bus protocol interface layer 304 of AFUM controller 220b2. In response, host bus protocol interface layer 304 in turn initiates a host bus protocol write response 4014 (e.g., HBP_Wr_Resp(NErr)) on the system fabric of host data processing system 100b. As noted previously, some host bus protocols do not natively include a host bus protocol write response indicating no error. In embodiments employing end-to-end communication of write responses as depicted in FIG. 40, the message sets of such host bus protocols can be extended to allow communication on the system fabric of a write response indicating no error (e.g., host bus protocol write response 4014). Of course, a different host bus protocol more directly compatible with the described message protocol can alternatively be employed.

In response to receipt of host bus protocol write response 4014, host transaction layer 306 of AFUM controller 220b1 issues a host write response 4016 indicating no error (e.g., Host_Wr_Resp(NErr)). Host write response 4016 is received and processed by CCR XLATE layer 2602 of AFUM controller 220a1 of host data processing system 100a. In response to receipt of host write response 4016, CCR XLATE layer 2602 of AFUM controller 220a1 translates host write response 4016 into an AFUM write response 4018 (e.g., AFUM_Rd_Resp) and forwards AFUM write response 4018 to host bus protocol interface layer 304 of AFUM controller 220a1. In response, host bus protocol interface layer 304 may, in turn, initiate a host bus protocol write response on the system fabric of host data processing system 100a if required or permitted by the host bus protocol of host data processing system 100a.

With reference to FIG. 41, there is illustrated a time-space diagram of a multi-hop write command issued by an initiating host data processing system to a receiving host data processing system via an intervening host data processing system and an associated response in accordance with another embodiment implementing a fast write response mode.

In the example of FIG. 41, an L2 cache 230 initiates an unillustrated host bus protocol write request on the system fabric of host data processing system 100a. The host bus protocol write request specifies a real address and data to be written to the real address. In response to receiving the host bus protocol write request, AFUM controller 220a1 determines by reference to its BAR 224 that it is responsible for the real address of the host bus protocol write request and accordingly issues a host write command 4100 (e.g., Host_Wr(Addr,Data)) to AFUM controller 220b1 of host data processing system 100b. Responsive to receiving host write command 4100, CCR XLATE layer 2602 of AFUM controller 220b1 translates host write command 4100, and optionally, the real address specified by host write command 4100 to obtain AFUM write command 4102 (AFUM_Wr (TAddr1,Data)). CCR XLATE layer 2602 of AFUM controller 220b1 then passes AFUM write command 4102 to host transaction layer 306 of AFUM controller 220b1.

Instead of awaiting the conclusion of the write operation, host transaction layer 306 of AFUM controller 220b1 responds to AFUM write command 4102 with a host write response 4116 indicating no error (e.g., Host_Wr_Resp (NErr)) without regard to processing of the write operation. Host write response 4116 is received and processed by CCR XLATE layer 2602 of AFUM controller 220a1, which translates host write response 4116 into an AFUM write response 4118 (e.g., AFUM_Wr_Resp). CCR XLATE layer 2602 of AFUM controller 220a1 forwards AFUM write response 4118 to the associated host bus protocol interface layer 304, which may, in turn, initiate a host bus protocol write response on the system fabric of host data processing system 100a if required or permitted by the host bus protocol of host data processing system 100a.

In addition is issuing host write response 4116, host transaction layer 306 of AFUM controller 220b1 responds to AFUM write command 4102 by issuing a host bus protocol write request 4104 (e.g., HBP_Wr(TAddr1,Data)) on the system fabric of host data processing system 100b. In response to receipt of host bus protocol write request 4104 on the system fabric of host data processing system 100b, AFUM controller 220b2 determines by reference to its BAR 224 that it is responsible for the real address of the host bus protocol write request 4104 and accordingly issues a host write command 4106 (e.g., Host_Wr(TAddr1,Data)) to AFUM controller 220c2 of host data processing system 100c. Responsive to receiving host write command 4106, CCR XLATE layer 2602 of AFUM controller 220c2 translates host write command 4106, and optionally, the translated real address specified by host write command 4106 to obtain AFUM write command 4108 (e.g., AFUM_Wr (TAddr2,Data)). CCR XLATE layer 2602 of AFUM controller 220c2 then passes this AFUM write command 4108 to host transaction layer 306 of AFUM controller 220c2, which, in turn, initiates a host bus protocol write request on the system fabric of host data processing system 100c and concurrently issues a host write response 4110 indicating no error (e.g., Host_Wr_Resp(NErr)) without regard to processing of the host bus protocol write request.

Host write response 4110 is received and processed by CCR XLATE layer 2602 of AFUM controller 220b2 of host data processing system 100b. In response to receipt of host write response 4110, CCR XLATE layer 2602 translates host write response 4110 into an AFUM write response 4112 (e.g., AFUM_Wr_Resp) and forwards AFUM write response 4112 to host bus protocol interface layer 304 of AFUM controller 220b2. As indicated, host bus protocol interface layer 304 of AFUM controller 220b2 does not further forward AFUM write response 4112 and thus refrains from forwarding AFUM write response 4112 to host data processing system 100a.

Given the foregoing description of memory sharing utilizing multi-hop communication, data processing environment 3800 can be configured to implement any of multiple different alternative modes for handling multi-hop memory sharing. In a first mode, multi-hop reads and writes can be handled utilizing end-to-end synchronous communication as shown in FIGS. 39-40. In a second mode, multi-hop reads can be handled utilizing end-to-end synchronous communication as shown in FIG. 39, and multi-hop writes can be handled utilizing the asynchronous communication of the fast write response mode shown in FIG. 41. In a third mode, multi-hop writes can be handled utilizing the asynchronous communication shown in FIG. 41, and multi-hop reads via the communication interface provided by AFUM controllers 220 are not permitted. Instead, in this third mode, reads from remote memories can be implemented utilizing conventional remote direct memory access (RDMA) write operations. For example, an initiating host wanting to read from a remote memory in a receiving host can write a read target address from which data is to be read into a specified memory location in the receiving host. In response to the receiving host detecting the write to the specified memory location, the receiving host accesses the requested data utilizing the read target address and writes the data into memory of the initiating host.

Figure 42:
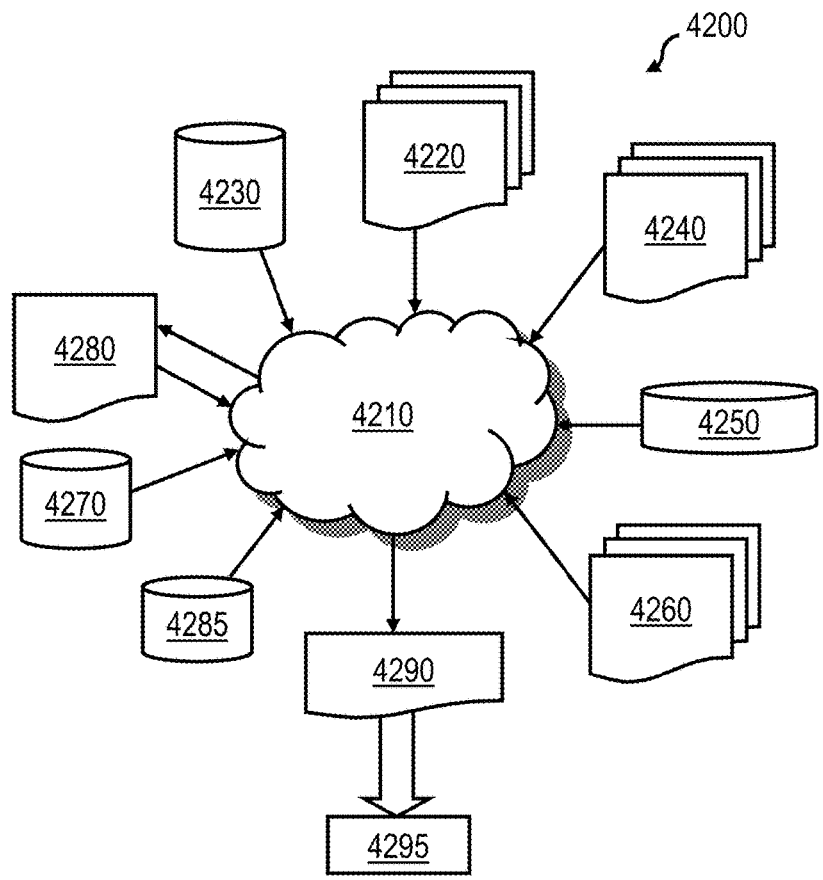
FIG. 42 is a data flow diagram illustrating a design process in accordance with one embodiment.

With reference now to FIG. 42, there is depicted a block diagram of an exemplary design flow 4200 used for example, in semiconductor IC logic design, simulation, test, layout, and manufacture. Design flow 4200 includes processes, machines and/or mechanisms for processing design structures or devices to generate logically or otherwise functionally equivalent representations of the design structures and/or devices described herein. The design structures processed and/or generated by design flow 4200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 4200 may vary depending on the type of representation being designed. For example, a design flow 4200 for building an application specific IC (ASIC) may differ from a design flow 4200 for designing a standard component or from a design flow 4200 for instantiating the design into a programmable array, for example a programmable gate array (PGA) or a field programmable gate array (FPGA) offered by Altera® Inc. or Xilinx® Inc.

FIG. 42 illustrates multiple such design structures including an input design structure 4220 that is preferably processed by a design process 4200. Design structure 4220 may be a logical simulation design structure generated and processed by design process 4200 to produce a logically equivalent functional representation of a hardware device. Design structure 4220 may also or alternatively comprise data and/or program instructions that when processed by design process 4200, generate a functional representation of the physical structure of a hardware device. Whether representing functional and/or structural design features, design structure 4220 may be generated using electronic computer-aided design (ECAD) such as implemented by a core developer/designer. When encoded on a machine-readable data transmission, gate array, or storage medium, design structure 4220 may be accessed and processed by one or more hardware and/or software modules within design process 4200 to simulate or otherwise functionally represent an electronic component, circuit, electronic or logic module, apparatus, device, or system such as those shown herein. As such, design structure 4220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 4200 preferably employs and incorporates hardware and/or software modules for synthesizing, translating, or otherwise processing a design/simulation functional equivalent of the components, circuits, devices, or logic structures shown herein to generate a netlist 4280 which may contain design structures such as design structure 4220. Netlist 4280 may comprise, for example, compiled or otherwise processed data structures representing a list of wires, discrete components, logic gates, control circuits, I/O devices, models, etc. that describes the connections to other elements and circuits in an integrated circuit design. Netlist 4280 may be synthesized using an iterative process in which netlist 4280 is resynthesized one or more times depending on design specifications and parameters for the device. As with other design structure types described herein, netlist 4280 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 4200 may include hardware and software modules for processing a variety of input data structure types including netlist 4280. Such data structure types may reside, for example, within library elements 4230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 4240, characterization data 4250, verification data 4260, design rules 4270, and test data files 4285 which may include input test patterns, output test results, and other testing information. Design process 4200 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 4200 without deviating from the scope and spirit of the invention. Design process 4200 may also include modules for performing standard circuit design processes such as timing analysis, verification, design rule checking, place and route operations, etc.

Design process 4200 employs and incorporates logic and physical design tools such as HDL compilers and simulation model build tools to process design structure 4220 together with some or all of the depicted supporting data structures along with any additional mechanical design or data (if applicable), to generate a second design structure 4290. Design structure 4290 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 4220, design structure 4290 preferably comprises one or more files, data structures, or other computer-encoded data or instructions that reside on transmission or data storage media and that when processed by an ECAD system generate a logically or otherwise functionally equivalent form of one or more of the embodiments of the invention. In one embodiment, design structure 4290 may comprise a compiled, executable HDL simulation model that functionally simulates the devices shown herein.

Design structure 4290 may also employ a data format used for the exchange of layout data of integrated circuits and/or symbolic data format (e.g., information stored in a GDSII (GDS2), GL1, OASIS, map files, or any other suitable format for storing such design data structures). Design structure 4290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 4290 may then proceed to a stage 4295 where, for example, design structure 4290: proceeds to tape-out, is released to manufacturing, is released to a mask house, is sent to another design house, is sent back to the customer, etc.

As has been described, in at least one embodiment, a communication interface of a second host data processing system receives, from a first host data processing system, a host command in a first command set. The host command specifies a memory access to a memory coupled to the second host data processing system. The communication interface translates the host command into a command in a different second command set emulating coupling of an attached functional unit to the communication interface. The communication interface presents the second command to a host bus protocol interface of the second host data processing system. Based on receipt of the second command, the host bus protocol interface initiates, on a system fabric of the second host data processing system, a host bus protocol memory access request specifying the memory access.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of communication in a data processing environment, the method comprising:
    configuring a communication interface of a second host data processing system, wherein the communication interface includes a first operating mode supporting attachment of an attached functional unit to the second host data processing system and a second operating mode supporting coupling of a first host data processing system to the second host data processing system for host-to-host memory sharing, and wherein configuring the communication interface includes configuring the communication interface in the second operating mode to support host-to-host memory sharing;
    receiving, from the first host data processing system at the communication interface of the second host data processing system, a host command in a first command set, the host command specifying a memory access to a memory coupled to the second host data processing system, wherein each of the first and second host data processing systems has a respective one of first and second coherent memory domains, and wherein the first and second coherent memory domains are non-coherent with each other;
    translating the host command into a second command in a different second command set such that the first host data processing system emulates an attached functional unit coupled to the communication interface of the second host data processing system;
    presenting the second command to a host bus protocol interface of the second host data processing system, the second host data processing system including a system fabric to which a plurality of communication participants are coupled; and
    based on receipt of the second command, initiating, by the host bus protocol interface on the system fabric of the second host data processing system, a host bus protocol memory access request specifying the memory access.

2. The method of claim 1, wherein:
    the second command specifies an address;
    the method further comprises pinning, in a page frame table of the second host data processing system, a page table entry for the address.

3. The method of claim 1, wherein:
    the communication interface is a first communication interface;
    the second host data processing system includes a second communication interface that is one of the plurality of communication participants coupled to the system fabric;
    the host command is a first host command; and
    the method further includes the second communication interface, based on receiving the host bus protocol memory access request on the system fabric, issuing a second host command specifying the memory access.

4. The method of claim 3, wherein issuing the second host command comprises issuing the second host command based on an address specified within the host bus protocol memory access request belonging to a predetermined address range.

5. The method of claim 3, wherein issuing the second host command comprises issuing the second host command to a third host data processing system including at least a processor core and a memory, wherein the third host data processing system has a third coherent memory domain that is non-coherent with the first and second coherent memory domains.

6. The method of claim 1, wherein:
    the translating includes translating a first address specified in the host command to a second address and placing the second address within the second command.

7. The method of claim 1, wherein:
    the host bus protocol memory access command is a read command;
    the method further comprises:
        the second host data processing system accessing data specified by the host bus protocol memory access request in a system memory of the second host data processing system and returning the data to the communication interface;
        the communication interface of the second host data processing system issuing a read response to the first host data processing system, the read response including the data.

8. The method of claim 7, and further comprising:
    a communication interface of the first host data processing system receiving the read response and translating the read response into a different second response set emulating an attached memory being coupled to the communication interface.

9. A method of communication in a data processing environment, the method comprising:
receiving, from a first host data processing system at a communication interface of a second host data processing system, a host command in a first command set, the host command specifying a memory access to a memory coupled to the second host data processing system, wherein each of the first and second host data processing systems has a respective one of first and second coherent memory domains, and wherein the first and second coherent memory domains are non-coherent with each other;
translating the host command into a second command in a different second command set such that the first host data processing system emulates an attached functional unit coupled to the communication interface of the second host data processing system;
presenting the second command to a host bus protocol interface of the second host data processing system, the second host data processing system including a system fabric to which a plurality of communication participants are coupled;
based on receipt of the second command, initiating, by the host bus protocol interface on the system fabric of the second host data processing system, a host bus protocol memory access request specifying the memory access, wherein the host bus protocol memory access command is a write command;
the second host data processing system writing data specified by the host bus protocol memory access request in a system memory of the second host data processing system; and
the communication interface of the second host data processing system, prior to completion of the writing and without regard to success or failure of the writing, issuing a write response to the first host data processing system indicating success of the write command.

10. A communication controller for a second host data processing system having a system fabric to which a plurality of communication participants are coupled, the communication controller comprising:
controller circuitry configured to perform:
receiving, from a first host data processing system, a host command in a first command set, the host command specifying a memory access to a memory coupled to the second host data processing system, wherein each of the first and second host data processing systems has a respective one of first and second coherent memory domains, and wherein the first and second coherent memory domains are non-coherent with each other;
translating the host command into a second command in a different second command set such that said first data processing system emulates coupling of an attached functional unit to the communication controller, wherein:
the communication controller has a first operating mode supporting attachment of an attached functional unit to the second host data processing system and a second operating mode supporting coupling of the second host data processing system to the first data processing system for host-to-host memory sharing;
the controller circuitry is configured to perform the translating only based on configuration of the communication controller in the second operating mode to support host-to-host memory sharing;
presenting the second command to a host bus protocol interface; and
based on receipt of the second command, initiating, by the host bus protocol interface on the system fabric of the second host data processing system, a host bus protocol memory access request specifying the memory access.

11. The communication controller of claim 10, wherein:
the translating includes translating a first address specified in the host command to a second address and placing the second address within the second command.

12. The communication controller of claim 10, wherein:
the host bus protocol memory access command is a read command;
the controller circuitry is further configured to perform:
receiving data specified by the host bus protocol memory access request from a system memory of the second host data processing system;
issuing, to the first host data processing system, a read response including the data.

13. A system comprising:
the communication controller of claim 12, wherein the communication controller is a first communication controller;
a second communication controller of the second host data processing system coupled to the first communication controller of the second host data processing system, wherein the second communication controller includes controller circuitry configured to perform:
receiving the read response and translating the read response into a different second response set emulating an attached memory being coupled to the second communication controller.

14. A system, comprising:
the communication controller of claim 10;
the host data processing system coupled to the communication controller, the host data processing system including a system memory storing a page frame table;
wherein:
the second command specifies an address;
the host data processing system is configured to pinning, in the page frame table of the system memory, a page table entry for the address.

15. A system, comprising:
the communication controller of claim 10, wherein the communication controller is a first communication controller, and wherein the host command is a first host command; and
the second host data processing system coupled to the communication controller, the second host data processing system including a second communication controller, wherein the second communication controller, based on receiving the host bus protocol memory access request on the system fabric, issues a second host command specifying the memory access.

16. The system of claim 15, wherein the second communication controller issues the second host command based on an address specified within the host bus protocol memory access request belonging to a predetermined address range.

17. The system of claim 15, wherein:
the second communication controller issues the second host command to a third host data processing system coupled to the second host data processing system.

18. A communication controller for a second host data processing system having a system fabric to which a plurality of communication participants are coupled, the communication controller comprising:
controller circuitry configured to perform:
receiving, from a first host data processing system, a host command in a first command set, the host command specifying a memory access to a memory coupled to the second host data processing system, wherein each of the first and second host data processing systems has a respective one of first and second coherent memory domains, and wherein the first and second coherent memory domains are non-coherent with each other;
translating the host command into a second command in a different second command set such that said first data processing system emulates coupling of an attached functional unit to the communication controller;
presenting the second command to a host bus protocol interface;
based on receipt of the second command, initiating, by the host bus protocol interface on the system fabric of the second host data processing system, a host bus protocol memory access request specifying the memory access, wherein the host bus protocol memory access command is a write command; and
without regard to success or failure of the write command, issuing a write response to the first data processing system indicating success of the write command.

19. A design structure tangibly embodied in a machine-readable storage device for designing, manufacturing, or testing an integrated circuit, the design structure comprising:
a communication controller for a second host data processing system having a system fabric to which a plurality of communication participants are coupled, the communication controller comprising:
controller circuitry configured to perform:
receiving, from a first host data processing system, a host command in a first command set, the host command specifying a memory access in a memory coupled to the second host data processing system, wherein each of the first and second host data processing systems has a respective one of first and second coherent memory domains, and wherein the first and second coherent memory domains are non-coherent with each other;
translating the host command into a second command in a different second command set such that said first data processing system emulates an attached functional unit coupled to the communication controller, wherein:
the communication controller has a first operating mode supporting attachment of an attached functional unit to the second host data processing system and a second operating mode supporting coupling of the second host data processing system to the first data processing system for host-to-host memory sharing;
the controller circuitry is configured to perform the translating only based on configuration of the communication controller in the second operating mode to support host-to-host memory sharing;
presenting the second command to a host bus protocol interface; and
based on receipt of the second command, initiating, by the host bus protocol interface on the system fabric of the second host data processing system, a host bus protocol memory access request specifying the memory access.

20. The design structure of claim 19, wherein:
the translating includes translating a first address specified in the host command to a second address and placing the second address within the second command.

21. The design structure of claim 19, wherein:
the host bus protocol memory access command is a read command;
the controller circuitry is further configured to perform:
receiving data specified by the host bus protocol memory access request from a system memory of the second host data processing system; and
issuing, to the first data processing system, a read response including the data.

22. A design structure tangibly embodied in a machine-readable storage device for designing, manufacturing, or testing an integrated circuit, the design structure comprising:
a communication controller for a second host data processing system having a system fabric to which a plurality of communication participants are coupled, the communication controller comprising:
controller circuitry configured to perform:
receiving, from a first host data processing system, a host command in a first command set, the host command specifying a memory access in a memory coupled to the second host data processing system, wherein each of the first and second host data processing systems has a respective one of first and second coherent memory domains, and wherein the first and second coherent memory domains are non-coherent with each other;
translating the host command into a second command in a different second command set such that said first data processing system emulates an attached functional unit coupled to the communication controller;
presenting the second command to a host bus protocol interface;
based on receipt of the second command, initiating, by the host bus protocol interface on the system fabric of the second host data processing system, a host bus protocol memory access request specifying the memory access, wherein the host bus protocol memory access command is a write command; and
without regard to success or failure of the write command, issuing a write response to the first data processing system indicating success of the write command.

* * * * *